(12) United States Patent
Walker et al.

(10) Patent No.: US 6,415,262 B1
(45) Date of Patent: Jul. 2, 2002

(54) METHOD AND APPARATUS FOR DETERMINING A SUBSCRIPTION TO A PRODUCT IN A RETAIL ENVIRONMENT

(75) Inventors: Jay S. Walker, Ridgefield; Andrew S. Van Luchene, Norwalk, both of CT (US); Deirdre O'Shea, New York, NY (US); Magdalena Mik, Greenwich, CT (US)

(73) Assignee: Walker Digital, LLC, Stamford, CT (US)

( * ) Notice: Subject to any disclaimer, the term of this patent is extended or adjusted under 35 U.S.C. 154(b) by 0 days.

(21) Appl. No.: 09/221,457

(22) Filed: Dec. 28, 1998

Related U.S. Application Data

(63) Continuation-in-part of application No. 08/889,589, filed on Jul. 8, 1997, now Pat. No. 5,970,470.

(51) Int. Cl.[7] .......................... G06F 17/00; G06F 17/60
(52) U.S. Cl. ............................ 705/14; 705/26
(58) Field of Search ..................... 705/14, 26

(56) References Cited

U.S. PATENT DOCUMENTS

| | | | |
|---|---|---|---|
| 3,754,630 A | 8/1973 | Gilker | 194/4 |
| 3,837,455 A | 9/1974 | Hurt | 194/4 R |
| 3,882,982 A | 5/1975 | Smith | 194/4 C |
| 3,938,638 A | 2/1976 | Moule | 194/4 C |
| 3,978,959 A | 9/1976 | Muellner | 194/4 R |
| 4,554,446 A | 11/1985 | Murphy et al. | 235/487 |
| 4,567,609 A | 1/1986 | Metcalf | 382/9 |
| 4,723,212 A | 2/1988 | Mindrum et al. | 364/401 |
| 4,817,166 A | 3/1989 | Gonzalez et al. | 382/1 |
| 4,833,609 A | 5/1989 | Grulke, Jr. | 364/405 |
| 4,878,248 A | 10/1989 | Shyu et al. | 382/9 |
| 4,908,761 A | 3/1990 | Tai et al. | 364/401 |
| 4,910,672 A | 3/1990 | Off et al. | 364/405 |
| 4,982,346 A | 1/1991 | Girouard et al. | 364/550 |
| 5,056,019 A | * 10/1991 | Schultz et al. | 705/14 |
| 5,081,685 A | 1/1992 | Jones, III et al. | 382/1 |
| 5,136,658 A | 8/1992 | Mori | 382/1 |

(List continued on next page.)

FOREIGN PATENT DOCUMENTS

| | | |
|---|---|---|
| EP | 0 025 754 A1 | 3/1981 |
| WO | WO 96/29668 | 9/1996 |
| WO | WO 97/23838 | 7/1997 |
| WO | WO 98/28699 | 7/1998 |
| WO | WO 99/11006 * | 3/1999 |
| WO | WO 00/39723 A3 | 7/2000 |

OTHER PUBLICATIONS

Beth Leibson, "Buying Contracts Deliver the Goods, and Hefty Discounts Too, Both Ironclad Furniture Purchase Contracts and Less Restrictive National Buying Agreements Can Save Your Company Big Bucks", Facilities Design & Management, Apr. 1991.

(List continued on next page.)

*Primary Examiner*—Eric W. Stamber
*Assistant Examiner*—James W. Myhre
(74) *Attorney, Agent, or Firm*—Dean P. Alderucci; Magdalena M. Fincham; Steven M. Santisi

(57) ABSTRACT

A method and apparatus for managing a subscription to a product in a retail environment, wherein the product for which a subscription is offered is selected based on the customer's historical purchases. The subscription defines a price for the selected product, wherein the subscription price is lower than the retail price of the product. The subscription specifies conditions which the customer has to meet in order to remain entitled to receive the subscription price for purchases of the product. Such conditions typically include a required frequency of purchases for a required period of time. The conditions of the subscription are selected so as to maximize the customer's visits to the business offering the subscription without unnecessarily eroding the profits of the business.

63 Claims, 19 Drawing Sheets

U.S. PATENT DOCUMENTS

| | | | | |
|---|---|---|---|---|
| 5,173,851 A | | 12/1992 | Off et al. | 364/401 |
| 5,185,695 A | * | 2/1993 | Pruchnicki | 705/14 |
| 5,256,863 A | | 10/1993 | Ferguson et al. | 235/383 |
| 5,297,026 A | * | 3/1994 | Hoffman | 705/14 |
| 5,315,664 A | | 5/1994 | Kumagai | 382/1 |
| 5,321,243 A | | 6/1994 | Groves et al. | 235/449 |
| 5,327,508 A | | 7/1994 | Deaton et al. | 382/7 |
| 5,331,544 A | | 7/1994 | Lu et al. | 364/401 |
| 5,380,991 A | | 1/1995 | Valencia et al. | 235/383 |
| 5,388,165 A | | 2/1995 | Deaton et al. | 382/7 |
| 5,434,394 A | | 7/1995 | Roach et al. | 235/375 |
| 5,448,471 A | | 9/1995 | Deaton et al. | 364/401 |
| 5,459,306 A | | 10/1995 | Stein et al. | 235/383 |
| 5,481,094 A | * | 1/1996 | Suda | 705/14 |
| 5,515,270 A | | 5/1996 | Weinblatt | 364/405 |
| 5,521,364 A | | 5/1996 | Kimura et al. | 255/383 |
| 5,537,314 A | | 7/1996 | Kanter | 364/406 |
| 5,612,868 A | | 3/1997 | Off et al. | 364/214 |
| 5,621,812 A | | 4/1997 | Deaton et al. | 382/100 |
| 5,636,346 A | | 6/1997 | Saxe | 395/201 |
| 5,638,457 A | | 6/1997 | Deaton et al. | 382/100 |
| 5,644,723 A | | 7/1997 | Deaton et al. | 395/214 |
| 5,675,662 A | | 10/1997 | Deaton et al. | 382/137 |
| 5,684,965 A | | 11/1997 | Pickering | 395/234 |
| 5,687,322 A | | 11/1997 | Deaton et al. | 395/214 |
| 5,689,100 A | | 11/1997 | Carrithers et al. | 235/380 |
| 5,710,557 A | | 1/1998 | Schuette | 340/932.2 |
| 5,710,886 A | * | 1/1998 | Christensen et al. | 705/1 |
| 5,717,989 A | | 2/1998 | Tozzoli et al. | 705/37 |
| 5,745,052 A | | 4/1998 | Matsuyama et al. | 340/932.2 |
| 5,758,328 A | | 5/1998 | Giovannoli | 705/26 |
| 5,774,868 A | * | 6/1998 | Cragun et al. | 705/10 |
| 5,774,870 A | | 6/1998 | Storey | 705/14 |
| 5,832,457 A | * | 11/1998 | O'Brien et al. | 705/14 |
| 5,857,175 A | * | 1/1999 | Day et al. | 705/14 |
| 5,970,469 A | | 10/1999 | Scroggie et al. | 705/14 |
| 5,970,470 A | | 10/1999 | Walker et al. | 705/14 |
| 5,974,396 A | * | 11/1999 | Anderson et al. | 705/10 |
| 5,999,914 A | * | 12/1999 | Blinn et al. | 705/26 |
| 6,012,039 A | * | 1/2000 | Hoffman et al. | 705/14 |
| 6,014,634 A | * | 1/2000 | Scroggie et al. | 705/14 |
| 6,029,153 A | * | 2/2000 | Bauchner et al. | 705/42 |
| 6,055,513 A | * | 4/2000 | Katz et al. | 705/26 |
| 6,073,112 A | * | 6/2000 | Geerlings | 705/14 |
| 6,078,897 A | | 6/2000 | Rubin et al. | 705/14 |
| 6,128,599 A | | 10/2000 | Walker et al. | 705/14 |

OTHER PUBLICATIONS

"CA–Manman/X: Purchase Contracts", Computer Associates International, Inc., Business and Management/Purchase Section, http://business.software–directory.com/software–2.cdprod1/002/, downloaded Oct. 27, 1999.

Leibson, Beth. "Buying Contracts Deliver the Goods, and Hefty Discounts Too," Facilities Design & Management, vol. 10, No. 4, pp. 54–57, Apr. 1991.

Williams, Dana. "CA–Manman/X: Purchase Contracts," Computer Associates International Inc., Date of Release: Jan. 1992, Tinnelly, Bettyann. "The Custom Switch Isn't a Rare Choice Anymore—Benefits Outweigh Added Costs, Makers Say," Electronic Buyers' News, No. 897, Mar. 28, 1994.

"Welcome to Planet U!" planet U (TM), Inc., (www.planetu.com/Pages/cons_index.html), Download Date: Nov. 23, 1998.

Brochure: "Reaching Out In New Directions", First Data Corp. Merchant Services, undated.

Bagot, Brian, "Brand Report: Service Please", Aug. 1990, Marketing & Media Decisions, pp. 79–83, ISSN: 0195–4296.

Casper, Carol, "Restaurants seek loyal customers.", Information Access Company, a Thomson Corporation Company, Cowles Business Media Inc. Direct, May 1994, vol. 6, No. 5, p. 18, ISSN: 1046–4174.

Zimmerman, Denise, "Food Lion Launches Frequent Shopper Plan", Supermarket News, Jan. 30, 1995, vol. 45, No. 5, at p. 17.

"Brazilian companies sell by affinity card", Lafferty Publications Ltd., Insurance Industry International, Feb. 1995, No. 32 at p. 6.

"Stop & Shop Debuts Mastercard", Information Access Company, a Thomson Corporation Company IAC (SM), Newsletter Database (TM) Lebhar–Friedman Inc., Oct. 23, 1995, No. 44, vol. 2.

Marriott, Anne, "A credit deal –or not?; Co–branded card's offer raise takers, debts", The Washington Times, Jul. 17, 1996, Section: Part B, Business at p. B7.

Cross, Richard and Smith, Janet, "The Customer Value Chain", American Demographics, Inc., Marketing Tools, Jan./Feb. 1997, Section: Database/Direct at p. 14.

Bradford, Stacey L., "Food Lion: King of the jungle?", Financial World, Jan. 21, 1997, Coden: Fiwoar, vol. 166, No. 1, p. 24, ISSN: 0015–2064, JRNL Code: Two.

Purpura, Linda, "Green Hills Farms finding gold in frequent--shopper cards.", Information Access Company, a Thomson Corporation Company, Capital Cities Media Inc., Supermarket News, Feb. 24, 1997, No. 8, vol. 47, p. 19, ISSN: 0039–5803.

Fickenscher, Lisa, "Merchant: American Express Seeks to Mine Its Data on Cardholder Spending Patterns", The American Banker, Mar. 24, 1997, Section: Credit/Debit/ATMS, p. 20.

Gilligan, Gregory J., "Ukrop's Branches Into Finance; For The Chain's CEO, This Was A Deal That Was Too Good To Miss", The Richmond Times Dispatch, Apr. 27, 1997, Section: Business at p. E–1.

Bowie, Liz, "Food Lion looks toward Baltimore; Area a 'growth market' to chain; 20–25 stores may come, sources say; Company keeping quiet; No–frills retailer poses competition for region leader Giant", The Baltimore Sun, Apr. 28, 1997, Section: Business at p. 11C.

Stoneback, Diane, "It's In The Cards; Supermarkets Deal Savings To Their Best Shoppers", The Morning Call (Allentown), Jun. 18, 1997, Section: A.M. Magazine at p. D1.

"A&P/Dominion Joins Air Miles (R) Reward Program", Canada NewsWire, Aug. 21, 1997, Financial News Section.

Purpura, Linda, "The great equalizer: when it comes to customer–loyalty programs, quick reactions to incoming data give independent retailers a competitive advantage.", Information Access Company, a Thomson Corporation Company, Capital Cities Media Inc., Supermarket News, Sep. 1, 1997, No. 35, vol. 47, p. 17, ISSN: 0039–5803.

Appel, Ted, "Smart Coupons Customers Save Big, Stores Track Spending With Discount Cards", The Press Democrat, Oct. 5, 1997 at p. E.1.

Blackwell, Richard, "Get Club Z points for shopping CIBC", The Financial Post, Oct. 9, 1997, Section: Section 1, News at p. 17.

Bird, Anat, "Super Community Banking: Sharpen Strategy to Keep Your Bank's Most Profitable Customers for Long Haul", The American Banker, Dec. 3, 1997, Section: Community Banking at p. 4.

"Here Come the Canadian Marketers", Faulker & Gray, a division of Thomson Information Services, Inc. a New York corporation, Jan. 1998, Section Card Watch.

Smith, Rebecca, "Buy More, Pay Less; Frequent Shopper Programs Promise A Brave New World In Grocery Buying", Pittsburgh Post–Gazette, Jan. 19, 1998, Section: Business, p. E–1.

"CIBC Club Z* VISA Card", (http //www cibc com/products/visa/VisaClubZ htm), download date: Feb. 1, 1998.

"Club Z –Your Rewards On–Line", (http //www hbc com/clubz/default asp), download date, Feb. 1, 1998.

"Frequent Shopper Programs Are Used By 14% Of All Supermarkets", (http //www retailtech com/archive/frequent htm), download date: Feb. 1, 1998.

"Turbocharging Your Customer–Loyalty Programs", (http //www retailtech com/archive/turbocha.htm), download date: Feb. 1, 1998.

Amato–McCoy, Deena, "Co–Branded Acme Credit Card Rewards Loyal Users", Information Access Company, a Thomson Corporation Company IAC (SM) PROMT (R), Capital Cities Media Inc., Supermarket News, Jun. 15, 1998, p. 17, ISSN: 0039–5803.

"Acme Markets, U.S. Bancorp Debut Visa Rewards Card", Phillips Business Information, Inc., Card News, Jun. 22, 1998, vol. 13, No. 12.

Website, "American Express Home Page", (http //www americanexpress com/), download date: Dec. 30, 1998.

* cited by examiner

| PRODUCT IDENTIFIER 620 | PRODUCT DESCRIPTION 622 | RETAIL PRICE 624 | COST 626 | SUBSCRIPTION PRICE 628 | CATEGORY IDENTIFIER 630 |
|---|---|---|---|---|---|
| P123 | MUSTARD | $0.69 | $0.18 | $0.64 | C2 |
| P124 | MILK | $1.79 | $1.20 | $1.70 | C1 |
| P125 | POTATOES | $1.59/LB | $0.59LB | $1.35/LB | C3 |
| P126 | DISH DETERGENT | $2.79 | $1.99 | $2.65 | C6 |
| P127 | RICE (1LB BAG) | $2.29 | $1.80 | $2.15 | C4 |
| P128 | DIAPERS (BOX OF 30) | $4.89 | $3.50 | $4.50 | C5 |
| P129 | JAR OF BABY FOOD | $1.50 | $0.46 | $1.35 | C5 |

| CATEGORY DESCRIPTION 720 | CATEGORY IDENTIFIER 722 | COMPLEMENTARY CATEGORY 724 |
|---|---|---|
| CONDIMENTS | C1 | C1 |
| PRODUCE | C2 | C7 |
| PASTA/GRAINS | C3 | C3;C7 |
| INFANT SUPPLIES | C4 | ALL |
| HOUSEHOLD CLEANING SUPPLIES | C5 | C4 |
| POULTRY/MEAT | C6 | C3;C4 |

FIG. 7

| FREQUENCY IDENTIFIER 820 | MEASURED FREQUENCY (DAYS) 822 | SUBSCRIPTION FREQUENCY (DAYS) 824 |
|---|---|---|
| A | 6-10 | 7 |
| B | 11-18 | 14 |
| C | 19-40 | 30 |

FIG. 8

| DURATION IDENTIFIER 920 | SUBSCRIPTION DURATION DESCRIPTION 922 |
|---|---|
| 1M | 1 MONTH |
| 3M | 3 MONTHS |
| 6M | 6 MONTHS |
| 1Y | 1 YEAR |

FIG. 9

| EXISTING SUBSCRIPTION PRODUCT IDENTIFIER <u>1020</u> | COMPLEMENTARY SUBSCRIPTION PRODUCT IDENTIFIER <u>1022</u> |
|---|---|
| P100 | P180, P140, P510 |
| P120 | P220, P900, P680, P170 |
| P130 | P100, P400 |
| P140 | P120, P190 |
| P125 | P135 |

| EXISTING SUBSCRIPTION FREQUENCY DURATION 1120 | COMPLEMENTARY SUBSCRIPTION FREQUENCY DURATION 1122 |
|---|---|
| A-3M | C-1Y |
| B-6M | A-1M |
| B-6M | C-1Y |
| C-1Y | A-6M; A-3M |
| C-1Y | A-3M |

| SUBSCRIPTION IDENTIFIER 1220 | DEPOSIT 1222 | PENALTY 1224 |
|---|---|---|
| A3M-100 | $2.00 | RETAIN DEPOSIT |
| A3M-P125 | $2.00 | $1.00 |
| A3M-P310 | $2.00 | $0.25 / PURCHASED MISSED |
| B6M-P125 | $3.00 | RETAIN DEPOSIT |
| C17-P180 | $3.00 | $4.00 |

| CUSTOMER IDENTIFIER: | | | C12345 | 1420 |
|---|---|---|---|---|
| NAME: | | | JOE SMITH | 1422 |
| ADDRESS: | | | 10 MAIN ST. TOWN, USA | 1424 |
| SUBSCRIPTION IDENTIFIER 1426 | SUBSCRIPTION START TIME 1428 | SUBSCRIPTION END TIME 1430 | TIME OF LAST UPDATE 1432 | STATUS 1434 |
| A3M-P100 | 1/4/99 | 4/4/99 | 1/11/99 | ACTIVE |
| B6M-P125 | 6/12/98 | 12/12/98 | 12/12/98 | FULFILLED |
| C1Y-P410 | 9/2/97 | 9/2/98 | 6/2/98 | FAILED |

1402 → (1426 row)
1404 → A3M-P100 row
1406 → B6M-P125 row

1450

| CUSTOMER IDENTIFIER: | | C12345 | 1470 |
|---|---|---|---|
| TRANSACTION IDENTIFIER 1472 | PRODUCT IDENTIFIER 1474 | TRANSACTION TIME 1476 | |
| T12345911 | P182; P130; P160; P410 | 1/16/99 12:49 PM | |
| T63819802 | P100; P142; P310 | 1/17/99 3:12 PM | |
| T79533123 | P180 | 1/18/99 2:08 AM | |

1452 → (1472 row)
1454 → T12345911 row
1456 → T63819802 row

FIG. 14

METHOD AND APPARATUS FOR DETERMINING A SUBSCRIPTION TO A PRODUCT IN A RETAIL ENVIRONMENT

The present application is a continuation-in-part application of commonly-owned, U.S. patent application Ser. No. 08/889,589 entitled "SYSTEM AND METHOD FOR ESTABLISHING AND MANAGING SUBSCRIPTION PURCHASE AGREEMENTS INCLUDING COMMITMENTS TO PURCHASE GOODS OVER TIME AT AGREED UPON PRICES" filed on Jul. 8, 1997, and issued on Oct. 19, 1999 as U.S. Patent No. 5,970,470, the entirety of which is incorporated herein by reference.

CROSS-REFERENCE TO RELATED APPLICATIONS

The present application is related to commonly-owned, co-pending U.S. patent application Ser. No. 09/049,297 entitled "SYSTEM AND METHOD FOR TRACKING AND ESTABLISHING A PROGRESSIVE DISCOUNT BASED UPON A CUSTOMER'S VISITS TO A RETAIL ESTABLISHMENT" filed on Mar. 27, 1998, the entirety of which is incorporated herein by reference.

FIELD OF THE INVENTION

The present invention relates to point-of-sale systems, and more specifically to methods and systems for determining and applying discounts by using point-of-sale systems.

BACKGROUND OF THE INVENTION

In most areas of business, several entities compete for the same set of potential customers. Consequently, each business must aggressively pursue marketing strategies to attract customers and induce customer loyalty to their particular establishment. For example, the grocery store industry is highly competitive. There are approximately seventy-five large supermarket chains in the United States. In an attempt to attract customers, members of the grocery store industry have employed a number of different promotions such as frequent shopper programs and weekly coupon specials. Despite these efforts, however, customer loyalty is no longer inherent due to the intense competition.

Another attempt to attract customers is the implementation of a frequent shopper program. Such a program typically provides a customer with a frequent shopper card that is to be presented at the time of a transaction. Presentation of the card identifies the customer and enables the customer to receive preferential treatment, such as discounts on specific items purchased. Essentially, these frequent shopper programs act much like a paperless coupon redemption system. The frequent shopper programs are also used by the business to track a customer's shopping habits. The frequent shopper card includes a customer identifier that enables the retailer to identify, record and track a customer's purchases. The customer's shopping history may then be used to perform targeted marketing functions, such as compiling mailing lists of recipients of advertising material or printing point-of-sale (POS) coupons for the customer.

While the frequent shopper program may succeed in attracting the customer to the store on an occasional basis, the program does not successfully ensure the loyalty of the customers. Since many stores have a frequent shopper program, customers may simply acquire a frequent shopper card for every chain of stores in their area and make purchases at the chain that offers the best specials or is the most convenient at any particular time. Accordingly, a frequent shopper program does not provide any incentive (i.e. reward or penalty) for visiting the store on a consistent basis.

A further drawback of the prior art frequent shopper systems is their failure to identify and reward their most frequent and loyal customers any more than less frequent customers are rewarded. For example, grocery stores make approximately eighty percent of their revenue from about thirty percent of their customers. It would therefore be beneficial for the grocery stores to reward and retain as many of the "best thirty percent" customers as possible.

Some businesses employ reward programs in order to attract and develop customer loyalty. An example of a typical reward program is one implemented by Arby's, a chain of quick service restaurants. The Arby's reward program enables customers to earn prizes that increase in value through a series of sixteen visits, after which the prizes revert to their minimum value and the cycle repeats. Since the customer's account is "reset" once the maximum prize value is achieved, the customer has no incentive at that point to continue choosing Arby's over another fast-food chain. In addition, the Arby's reward program does not promote frequent visits, since there is no time requirement within which the sixteen visits must be made. Thus, the benefits, if any, may be spread over a substantial length of time.

With the considerable number of businesses in any given area, there exists a need for systems and processes which provide a given business with the ability to reward a particularly loyal customer for consistent patronage to their establishment and to promote and reinforce the customer's loyalty.

SUMMARY OF THE INVENTION

It is an object of the present invention to provide a method and apparatus that facilitates the management of subscriptions to products in a retail environment.

In accordance with the present invention, a controller receives a customer identifier and data regarding purchase of the customer. The data may correspond to a current purchase of the customer and/or previous purchases of the customer. The controller, based on the customer identifier and subscription offering criteria, determines a subscription to a product. Examples of subscription offering criteria include a frequency with which the customer purchased a certain product and any existing subscriptions the customer is currently subscribed to. The controller then outputs to the customer an offer for the subscription. The offer defines subscription conditions, which may include (i) a product, (ii) a duration of the subscription, (iii) a product price, (iv) a required frequency of purchases, and (v) a subscription deposit. If the customer accepts the offer, the acceptance is stored in memory. A subscription deposit may be charged to the customer upon indication of the acceptance.

BRIEF DESCRIPTION OF THE DRAWINGS

FIG. 6 is a schematic illustration of an inventory database of the POS controller of FIG. 5.

FIG. 7 is a schematic illustration of a product category database of the POS controller of FIG. 5.

FIG. 8 is a schematic illustration of a subscription frequency database of the POS controller of FIG. 5.

FIG. 9 is a schematic illustration of a subscription duration database of the POS controller of FIG. 5.

FIG. 10 is a schematic illustration of a complementary subscription products database of the POS controller of FIG. 5.

FIG. 11 is a schematic illustration of a complementary subscription conditions database of the POS controller of FIG. 5.

FIG. 12 is a schematic illustration of an available subscriptions database of the POS controller of FIG. 5.

FIG. 14 is a schematic representation of an exemplary record of a customer database of the POS controller of FIG. 5 and of an exemplary record defining an aggregate of transactions from a transaction database of the POS controller of FIG. 5.

DETAILED DESCRIPTION OF THE PREFERRED EMBODIMENTS

In accordance with the present invention, there are provided new and improved systems and methods that enable a business to provide a customer with a subscription to a product in order to encourage the customer to participates in transactions on a regular, frequent basis (e.g. once per week). The subscription provides the customer with a discounted price on the product defined by the subscription. The subscription also defines conditions that the customer has to meet in order to remain entitled to the discounted price. The conditions may include a subscription frequency and a subscription duration. The subscription frequency defines the length of time between required product purchases of the subscription. The subscription duration is the time during which the conditions defined by the subscription are imposed on the customer and during which the customer is provided with the subscription price for the product of the subscription. In some embodiments of the present invention, the customer may be penalized for failing to fulfill the conditions of the subscriptions. The penalty may be a charge of a monetary amount.

The following terms are used throughout the remainder of this section. For purposes of construction, such terms shall have the following meanings:

The term "product", unless otherwise specified, refers to anything (e.g. a good or service) sold or offered for sale by a business.

The term "business", unless otherwise specified, refers to any entity that allows customers to purchase products. A business may be, for example, a retail store such as a warehouse, a supermarket, or grocery store, a department store, or any other merchandising establishment.

The term "customer", unless otherwise specified, refers to any person, group of people, or other entity that visits or otherwise patronizes a business and/or purchases products from the business.

The term "transaction", unless otherwise specified, refers to an exchange of a product offered by a business for a payment or other consideration provided by the customer.

Figure 1:
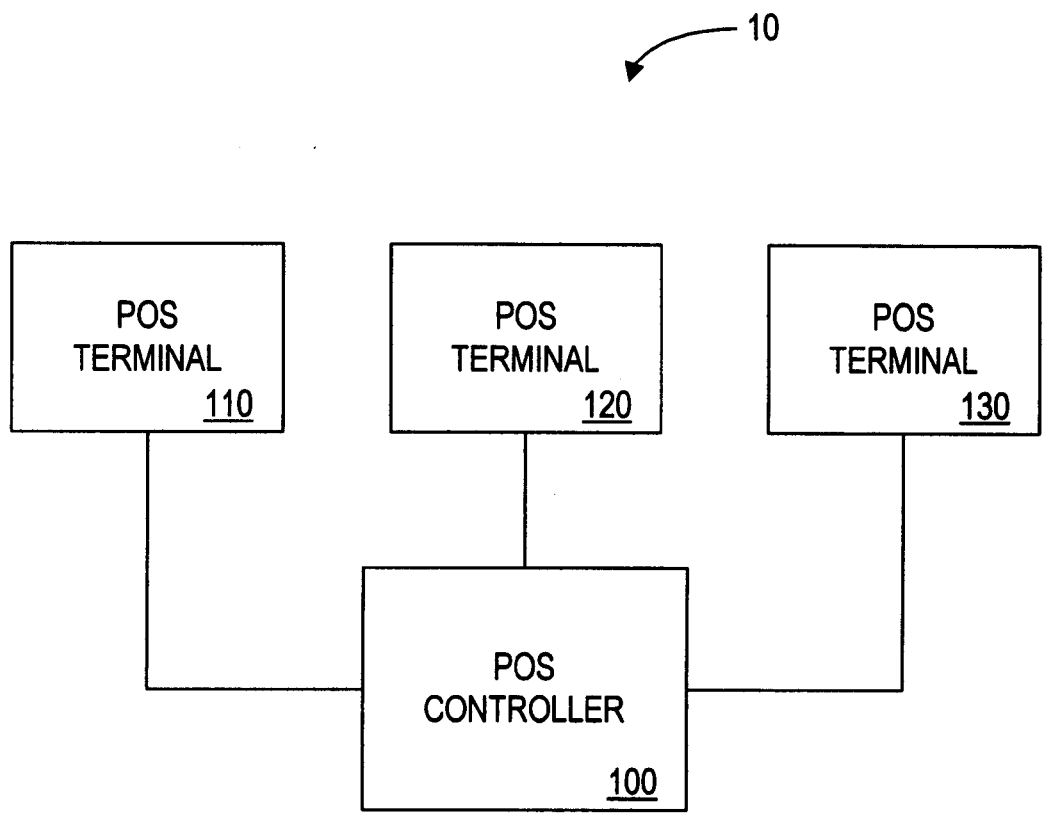
FIG. 1 is a schematic illustration of a product subscription system provided in accordance with the present invention.

Referring now to FIG. 1 therein depicted is a schematic illustration of one embodiment of a product subscription system 10 for a business. The product subscription system 10 is operable to record a customer's transaction, determine the customer's subscription in accordance with a customer identifier, and, if appropriate, apply a subscription price to the customer's transaction. The product subscription system 10 is also operable to select and output an offer for a subscription to the customer. The product subscription system 10 includes a point of sale (POS) controller 100 in communication with a plurality of POS terminals 110, 120, and 130 via a network. The product subscription system 100 may include any number of POS terminals although three are shown in FIG. 1.

The POS controller 100 directs the operation of, stores data from and transmits data to the POS terminals 110, 120 and 130. The POS controller may itself be a POS terminal, as described herein, or may be another computing device that can communicate with one or more POS terminals. Each of the POS terminals 110, 120 and 130 may be located in the same store, in different stores of a chain of stores, or in other locations. The POS controller 100 may perform many of the processes described below, especially those processes that are performed for more than one POS terminal. The POS controller 100 may furthermore store data, such as an inventory database, that is to be shared by the POS terminals 110, 120 and 130. Similarly, data described herein as stored on the POS controller may be stored on any or all of the POS terminals 110, 120 and 130, as appropriate.

Figure 2:
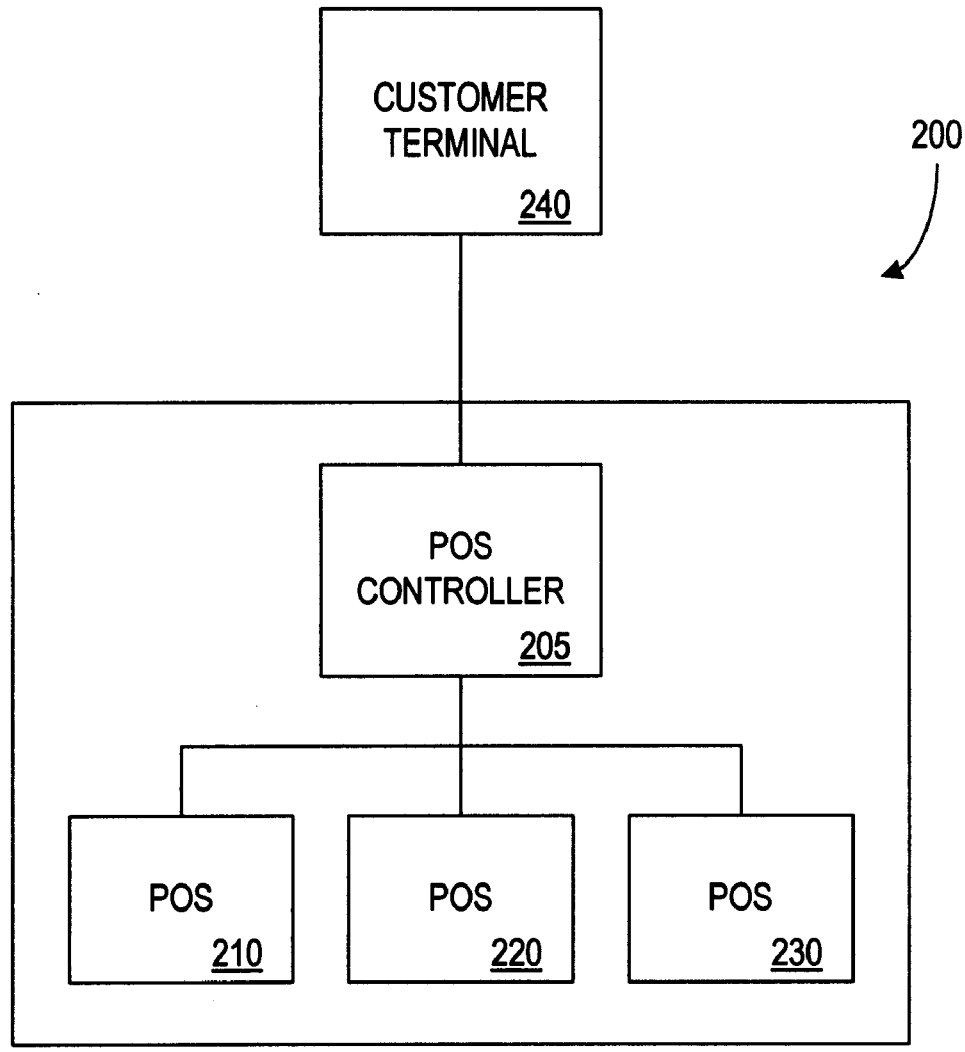
FIG. 2 is a schematic illustration of a product subscription system provided in accordance with an alternate embodiment of the present invention.

FIG. 2 is a schematic illustration of product subscription system 200 which is another embodiment of the product subscription system 10 of FIG. 1. Product subscription system 200 is operable to perform substantially the same functions as product subscription system 10. Product subscription system 200, however, is further operable to output offers for subscriptions to customers at a remote customer terminal. A remote customer terminal is a terminal at a location other than a point-of-sale. In product subscription system 200, the customer may receive or request such offers through a customer terminal 240. Customer terminal 240 may comprise, for example, a Kiosk or a personal computer (PC). Such a kiosk may, for example, be located at (i) the business offering the subscriptions, or (ii) another business. A personal computer may, for example, be located at (i) the business offering the subscription, (ii) at a business other than the one offering the subscription, or (iii) at the customer's home or office. Thus, the customer may receive, request, or register for subscriptions to products remotely by, for example, accessing an Internet site hosted by the business.

The customer terminal 240 allows the customer to receive or request offers for subscriptions at times other than during a transaction. Further details on the functionality of customer terminal 240 will be discussed below. The customer terminal 240 is in communication with POS controller 205. POS controller 205 is operable to perform substantially the same functions as POS controller 100 (FIG. 1). POS controller 205 is in communication with POS terminal 210, POS terminal 220, and POS terminal 230, in an arrangement substantially the same as the one described in FIG. 1. The POS controller 205 may be a "web server" of the business. The POS controller 205 can generate a web page that may be accessed via the World Wide Web and allow offers to be submitted to the customer. The customer terminal 240 may appropriately access the web page to communicate with the POS controller 205 in a manner known to those skilled in the art. The customer terminal 240 may further include a printer (not shown) for printing coupons or vouchers that the customer may utilize in order to receive a subscription price for the product defined by the subscription. Such coupons will be described in more detail below. Alternately, the customer may have the coupons or vouchers e-mailed to him on a periodic basis once he is registered for a subscription.

Figure 3:
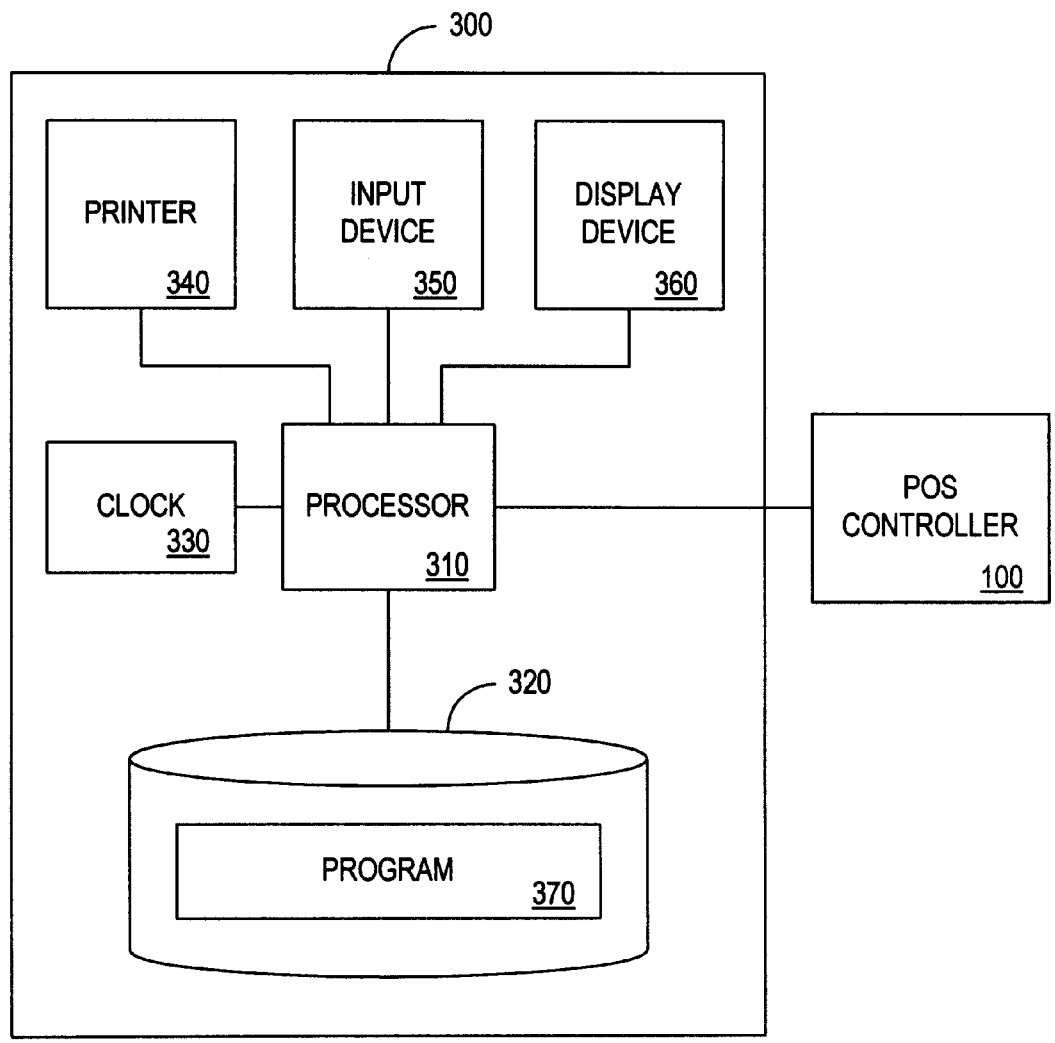
FIG. 3 is a schematic illustration of a POS terminal of the product subscription system of FIG. 1.

FIG. 3 depicts a POS terminal 300 which is descriptive of any or all of the POS terminals 110, 120, and 130 (FIG.1). The POS terminal 300 includes a processor 310, such as one or more conventional microprocessors, e.g. Intel Pentium® microprocessors. The processor 310 is connected to a data storage device 320, a clock 330, a printer 340, an input device 350, a display device 360 and the POS controller 100. The data storage device 320 comprises an appropriate combination of magnetic, optical and/or semiconductor memory, such as random access memory (RAM), read only memory (ROM), floppy disk, hard disk or combination thereof. The data storage device 320 stores a program 370. The program 370 controls the processor 310 in accordance with the present invention, and particularly in accordance with the processes described in detail hereinafter. The program 370 also includes any necessary program elements, such as "device drivers" for interfacing with the POS controller 100 (FIG. 1). Appropriate device drivers and other necessary program elements are known to those skilled in the art, and need not be described in detail herein.

The clock 330 generates the time of a transaction. The time may consist of the date and/or time of day, and may be stored in association with other transaction information, such as the price of the transaction. The printer 340 is controlled by the processor 310 and outputs information such as the receipt for the current transaction and an indication of the subscription price applied to the transaction. The input device 350 communicates information to the processor 310 and may consist of, for example, a scanning device (e.g. an optical bar code scanner), a keyboard, or a magnetic stripe reader. The communicated information may be, for example, products included in a current transaction and a customer identifier. The display device 360 receives information from, and is controlled by, the processor 310, and may display the information to the cashier operating the POS terminal, to the customer, or a combination thereof. The displayed information may include, for example, (i) the transaction price, (ii) an offer for a subscription, and/or (iii) the discounted subscription price of a subscription the customer is currently subscribed to that is being applied to the transaction. The display device may comprise, for example, a video monitor that is at least capable of displaying alphanumeric characters. Many types of input devices, printers, and display devices are known to those skilled in the art, and need not be described in detail herein.

The processor 310 and the data storage device 320 may each be (i) located entirely within a single computer or other computing device; (ii) connected thereto by a remote communication link, such as a serial port cable, telephone line or radio frequency transceiver; or (iii) a combination thereof. For example, the POS terminal 300 may comprise one or more cash registers connected to a remote server computer for maintaining databases. Many types of conventional cash registers and other types of POS terminals may be used to implement the present invention in light of the present disclosure.

Figure 4:
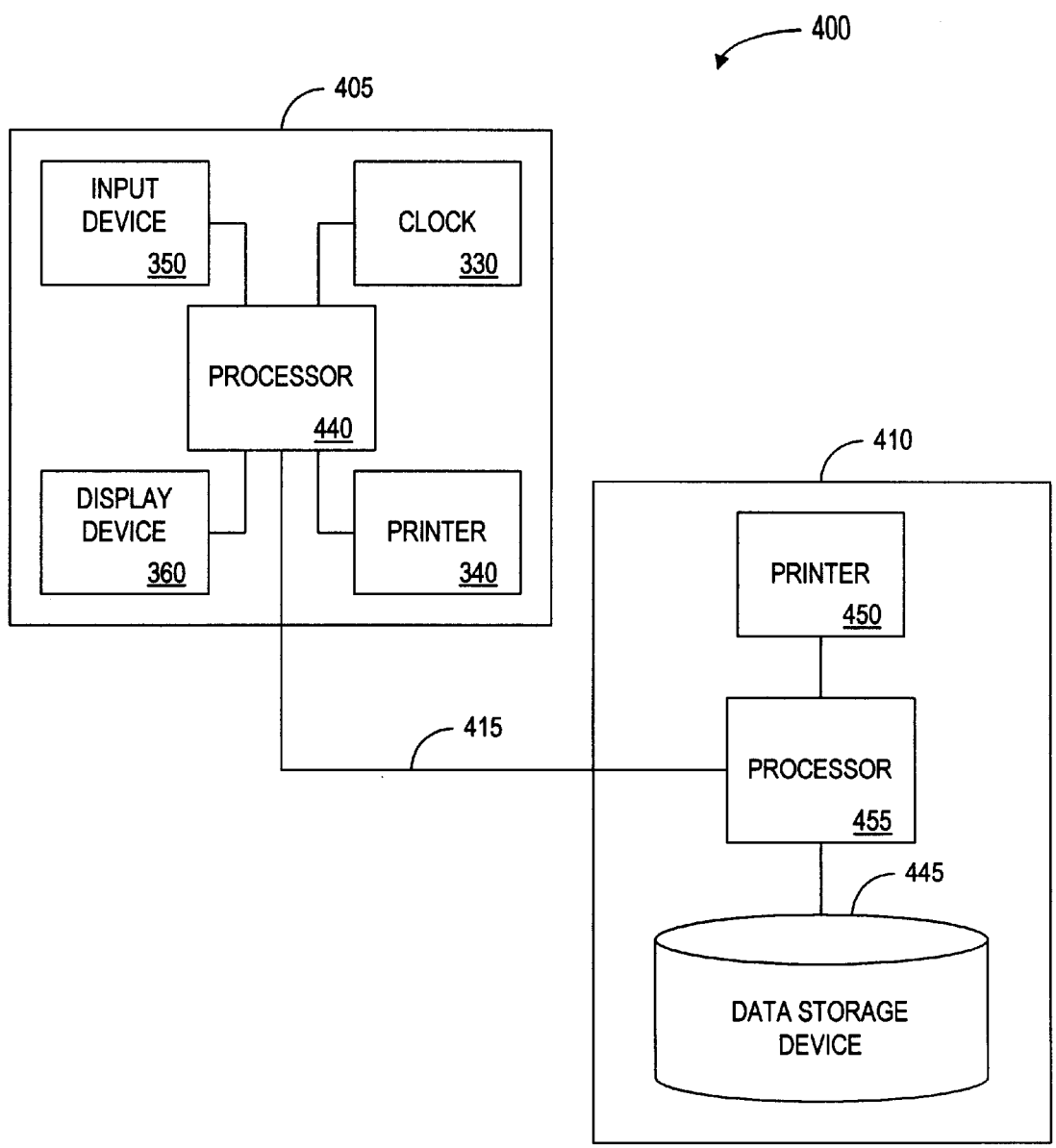
FIG. 4 is a schematic illustration of an alternate embodiment of a POS terminal of the product subscription system of FIG. 1.

FIG. 4 illustrates a POS terminal 400, which is descriptive of another embodiment of any or all the POS terminals 110, 120, and 130 (FIG. 1). In the embodiment of FIG. 4, first device 405 communicates with a second device 410 via a remote communication link 415. The first device 405, which may be a cash register, comprises the clock 330, the printer 340, the input device 350, the display device 360, and a processor 440 which performs at least some of the functions of the processor 310 of FIG. 3. The second device 410 may be, for example, a processing system operated by an electronic marketing service or credit card clearinghouse. The second device 410 comprises a data storage device 445, a printer 450, and a processor 455 which performs at least some of the functions of the processor 310 of FIG. 3. In this embodiment, the first device 405 may be a cash register, and the second device 410 may be an electronic device for determining discounts in accordance with data received from the cash register. Other configurations of the POS terminal 400 will be understood by those skilled in the art.

Figure 5:
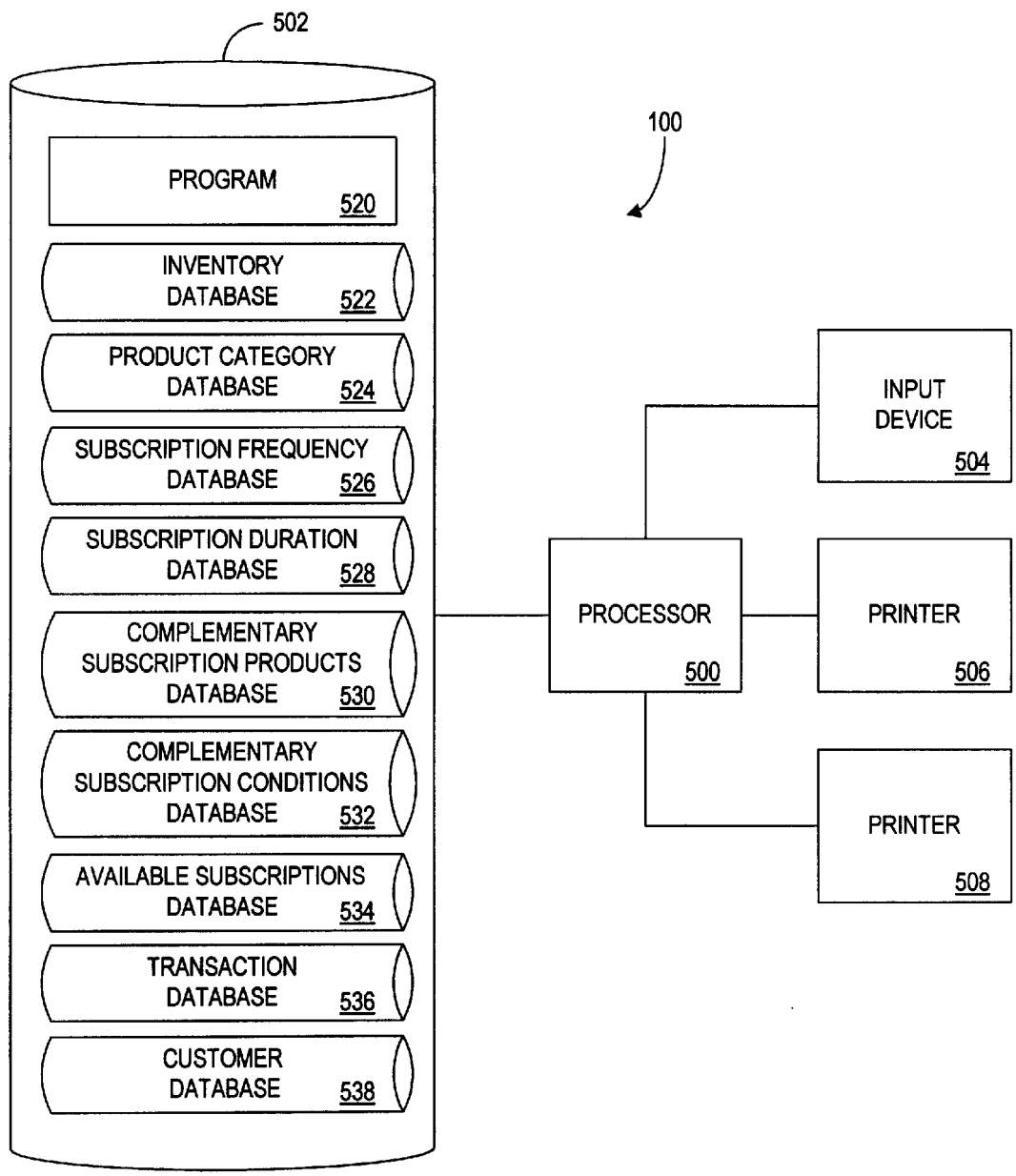
FIG. 5 is a schematic illustration of a POS controller of the product subscription system of FIG. 1.

FIG. 5 illustrates the POS controller 100 (FIG. 1), which comprises a processor 500, such as one or more conventional microprocessors, such as the Intel Pentium® microprocessor. The processor 500 is in communication with a data storage device 502, such as an appropriate combination of magnetic, optical and/or semiconductor memory, as is apparent to those skilled in the art. The processor 500 and the storage device 502 may each be (i) located entirely within a single computer or other computing device; (ii) connected to each other by a remote communication medium, such as a serial port cable, telephone line or radio frequency transceiver; or (iii) a combination thereof. For example, the POS controller 100 may comprise one or more conventional computers that are connected to a remote server computer for maintaining databases.

An input device 504 preferably comprises a keypad for transmitting input signals to the processor 500. A printer 506 is for registering indicia on paper or other material, thereby printing reports and other documents as controlled by the processor 500. A display device 508 is preferably a video monitor for displaying at least alphanumeric characters. Many types of input devices, printers and display devices are known to those skilled in the art, and need not be described in detail herein. The input device 504, printer 506 and display device 508 are each in communication with the processor 500.

The storage device 502 stores a program 520 for controlling the processor 500. The processor 500 performs instructions of the program 520, and thereby operates in accordance with the present invention, and particularly in accordance with the methods described in detail herein. The program 520 furthermore includes program elements that may be necessary, such as an operating system and "device drivers" for allowing the processor 500 to interface with computer peripheral devices, such as the input device 504, the printer 506 and the display device 508. Appropriate operating systems, device drivers and other necessary program elements are known to those skilled in the art, and need not be described in detail herein.

The storage device 502 also stores (i) an inventory database 522, (ii) a product category database 524, (iii) a subscription frequency database 526, (iv) a subscription duration database 528, (v) a complementary subscription products database 530, (vi) a complementary subscription conditions database 532, (vii) an available subscriptions database 534, (viii) a transaction database 536, and (ix) a customer database 538. The databases 522, 524, 526, 528, 530, 532, 534, 536, and 538 are described in detail below and depicted with exemplary entries in the accompanying figures. As will be understood by those skilled in the art, the schematic illustrations and accompanying descriptions of the databases presented herein are exemplary arrangements for stored representations of information. A number of other arrangements may be employed besides the tables shown. Similarly, the illustrated entries represent exemplary information, and those skilled in the art will understand that the number and content of the entries can be different from those illustrated herein.

Referring to FIG. 6, a table 600 represents an embodiment of the inventory database 522 (FIG. 5). The table 600 includes entries 602, 604, 606, 608, 610, 612 and 614, each defining a product. It will be understood by those skilled in the art that the table 600 may include any number of entries. The table 600 also defines fields for each of the entries 602, 604, 606, 608, 610, 612 and 614, which specify (i) a product identifier 620 that uniquely identifies the product, (ii) a description 622 of the product, (iii) a retail price 624 of the product, (iv) a cost 626 of the product to the business selling the product, (v) a subscription price 628 of the product, and (vi) a category identifier 630 of the product. Information stored in the inventory database 522 is available to the POS terminals 110, 120 and 130 (FIG. 1), so that any POS terminal may, for example, calculate a price of a transaction that includes one or more products that are purchased. The information stored in the inventory database 522, particularly the selection of available products and their retail prices and subscription prices, is typically established by a manager of the business or other personnel.

Referring to FIG. 7, a table 700 represents an embodiment of the product category database 524 (FIG. 5). The table 700 includes entries 702, 704, 706, 708, 710, and 712, each defining a product category. It will be understood by those skilled in the art that the table 700 may include any number of entries. The table 700 also defines fields for each of the entries 702, 704, 706, 708, 710, and 712, which specify (i) a description 720 of the category, (ii) a unique identifier 722 of the category, and (iii) a complementary category 724 of the category. The complementary category field 724 may contain multiple category identifiers, as illustrated in entries 706 and 712. The complementary category field may also contain a category identifier of "all", as illustrated by entry 708. A category identifier of "all" indicates that any of the categories may serve as complementary categories to the specified category.

Information stored in the product category database 524 is available to the POS terminals 110, 120 and 130 (FIG. 1) and/or to the POS controller 100, so that any POS terminal or the POS controller 100 may, for example, determine a complementary category from which to offer a product subscription to the customer. Such a determination may comprise, for example, determining a product category of a product to which the customer currently has an existing subscription and offering the customer a subscription to a product from a complementary product category. The information stored in the product category database 524, particularly the selection of complementary categories, is typically established by a manager of the business or other personnel.

Referring to FIG. 8, a table 800 represents an embodiment of the subscription frequency database 526 (FIG. 5). The table 800 includes entries 802, 804, and 806, each defining a subscription frequency. It will be understood by those skilled in the art that the table 800 may include any number of entries. The table 800 also defines fields for each of the entries 802, 804, and 806, which specify (i) a unique frequency identifier 820 of the subscription, (ii) a measured frequency 822 of a customer's purchases of a product, and (iii) a subscription frequency 824 of the subscription. In other embodiments of the present invention, the measured frequency 822 may instead or in addition be an anticipated frequency. For example, rather than determining a frequency with which a customer has purchased a product (i.e. a measured frequency), the product subscription system 10 (FIG. 1) may instead determine a frequency with which a customer is likely to purchase a product. Such a determination may be based on the measured frequency with which he has purchased another product (i.e. an anticipated frequency).

Information stored in the subscription frequency database 526 may be available to the POS terminals 110, 120 and 130 (FIG. 1) and/or to the POS controller 100, so that any POS terminal or the POS controller 100 may, for example, determine a subscription frequency to be included in a subscription offer being output to a customer. Such a determination may comprise, for example, determining a measured frequency with which the customer purchases a product, and then selecting a subscription frequency based on the measured frequency. In one embodiment, the subscription frequency database 526 provides a subscription frequency corresponding to the measured frequency. A measured frequency may be determined by evaluating previous transactions based on the customer identifier, as will be discussed in more detail below. The information stored in the subscription frequency database 526, particularly the selection of subscription frequencies, is typically established by a manager of the business or other personnel.

Referring to FIG. 9, a table 900 represents an embodiment of the subscription duration database 528 (FIG. 5). The table 900 includes entries 902, 904, 906, and 908, each defining a subscription duration. It will be understood by those skilled in the art that the table 900 may include any number of entries. The table 900 also defines fields for each of the entries 902, 904, 906, and 908, which specify (i) a unique subscription duration identifier 920 of the subscription, and (ii) a subscription duration description 922.

Information stored in the subscription duration database 528 may be available to the POS terminals 110, 120 and 130 (FIG. 1) and/or to the POS controller 100, so that any POS terminal or the POS controller 100 may, for example, determine the subscription duration to be included in a subscription offer being output to a customer. Such a determination may comprise, for example, determining a subscription duration of an existing subscription the customer is currently subscribed to and including a different subscription duration in the offer being output to the customer. The information stored in the subscription duration database 528, particularly the selection of subscription durations, is typically established by a manager of the business or other personnel.

Referring to FIG. 10, a table 1000 represents an embodiment of the complementary subscription products database 530 (FIG. 5). The table 1000 includes entries 1002, 1004, 1006, 1008, and 1010, each defining at least one complementary product associated with a product of an existing subscription. It will be understood by those skilled in the art that the table 1000 may include any number of entries. The table 1000 also defines fields for each of the entries 1002, 1004, 1006, 1008, and 1010, which specify (i) an existing subscription product identifier 1020, and (ii) a complementary subscription product identifier 1022.

Information stored in the complementary products database 530 may be available to the POS terminals 110, 120 and 130 (FIG. 1) and/or to the POS controller 100, so that any POS terminal or the POS controller 100 may, for example, determine the product to be included in a subscription offer being output to a customer. Such a determination may comprise, for example, determining the product identifier of an existing subscription the customer is currently subscribed to and looking up a complementary product identifier in the complementary products database 530. The complementary subscription product identifier 1022 may include multiple product identifiers, as illustrated by entry 1002, 1004, 1006, and 1008. When a product identifier of an existing subscription is determined to be associated with multiple complementary products, the product subscription system 10 (FIG. 1) may (i) output a choice of subscription offers to the customer for each of the complementary products, (ii) randomly select one of the complementary products to include in the subscription offer, (iii) select a complementary product based on external factors, such as the time of day or the outside temperature, or (iv) select a complementary product based on a priority associated with the available complementary products. The information stored in the complementary products database 530, particularly the selection of complementary subscription products, is typically established by a manager of the business or other personnel.

Referring to FIG. 11, a table 1100 represents an embodiment of the complementary subscription conditions database 532 (FIG. 5). The subscription conditions included in table 1100 comprise subscription frequency and duration combinations. The table 1100 includes entries 1102, 1104, 1106, 1108, and 1110, each defining at least one complementary duration and frequency associated with a duration and frequency of an existing subscription. It will be understood by those skilled in the art that the table 1100 may include any number of entries. The table 1100 also defines fields for each of the entries 1102, 1104, 1106, 1108 and 1110 which specify (i) an existing subscription frequency and duration 1120, and (ii) a complementary subscription frequency and duration 1122. A subscription frequency and duration condition of table 1100 correspond to the combination of a subscription frequency identifier 820 of table 800 (FIG. 8) and a subscription duration identifier 920 of table 900 (FIG. 9), the two identifiers being separated by a hyphen.

Information stored in the complementary subscription conditions database 532 may be available to the POS terminals 110, 120 and 130 (FIG. 1) and/or to the POS controller 100, so that any POS terminal or the POS controller 100 may, for example, determine the frequency and duration conditions to be included in a subscription offer being output to a customer. Such a determination may comprise, for example, determining the frequency and duration of an existing subscription the customer is currently subscribed to and looking up a complementary frequency and duration in the complementary subscription conditions database 532. The complementary subscription frequency and duration 1122 may include multiple identifiers, as illustrated by entry 1108. When a frequency and duration of an existing subscription is determined to be associated with multiple complementary combinations of frequency and duration, the product subscription system 10 (FIG. 1) may (i) output a choice of subscription offers to the customer for each of the complementary frequency and duration combinations, (ii) randomly select one of the complementary frequency-duration combinations to include in the subscription offer, (iii) select a complementary frequency and duration combination based on external factors, such as the time of day or the outside temperature, or (iv) select a complementary frequency and duration combination based on a priority associated with the available complementary subscription frequency and duration combinations. The information stored in the complementary subscription conditions database 532, particularly the selection of complementary subscription frequency and duration combinations, is typically established by a manager of the business or other personnel.

Referring to FIG. 12, a table 1200 represents an embodiment of the available subscriptions database 534 (FIG. 5). The table 1200 includes entries 1202, 1204, 1206, 1208, and 1210, each defining at an available subscription. It will be understood by those skilled in the art that the table 1200 may include any number of entries. The table 1200 also defines fields for each of the entries 1202, 1204, 1206, 1208 and 1210 which specify (i) a unique subscription identifier 1220, (ii) a deposit 1222 required to initiate the subscription, and (iii) a penalty 1224 imposed on a customer that does not successfully complete the subscription. A subscription identifier 1220 comprises a combination of a frequency identifier 820 (FIG. 8), a duration identifier 920 (FIG. 9) and a product identifier 620 (FIG. 6). Successfully completing a subscription comprises satisfying all of the conditions of the subscription during the duration of the subscription. The penalty defined by each subscription is the action to be taken if the customer does not successfully complete a subscription he is subscribed to. For example, entry 1202 indicates that the penalty associated with subscription "A3M-P1" consists of a retention of the deposit the customer had paid upon initiating the subscription.

Information stored in the available subscriptions database 534 may be available to the POS terminals 110, 120 and 130 (FIG. 1) and/or to the POS controller 100, so that any POS terminal or the POS controller 100 may, for example, determine an available subscription to offer a customer. Such a determination may comprise, for example, determining the historical purchases of a product by a customer, determining the product identifier of the product, measuring the frequency of the purchases, and selecting a subscription from the available subscriptions database based on those determinations. The information stored in the available subscriptions database 534, particularly the selection of the available subscriptions, is typically established by a manager of the business or other personnel.

Figure 13:
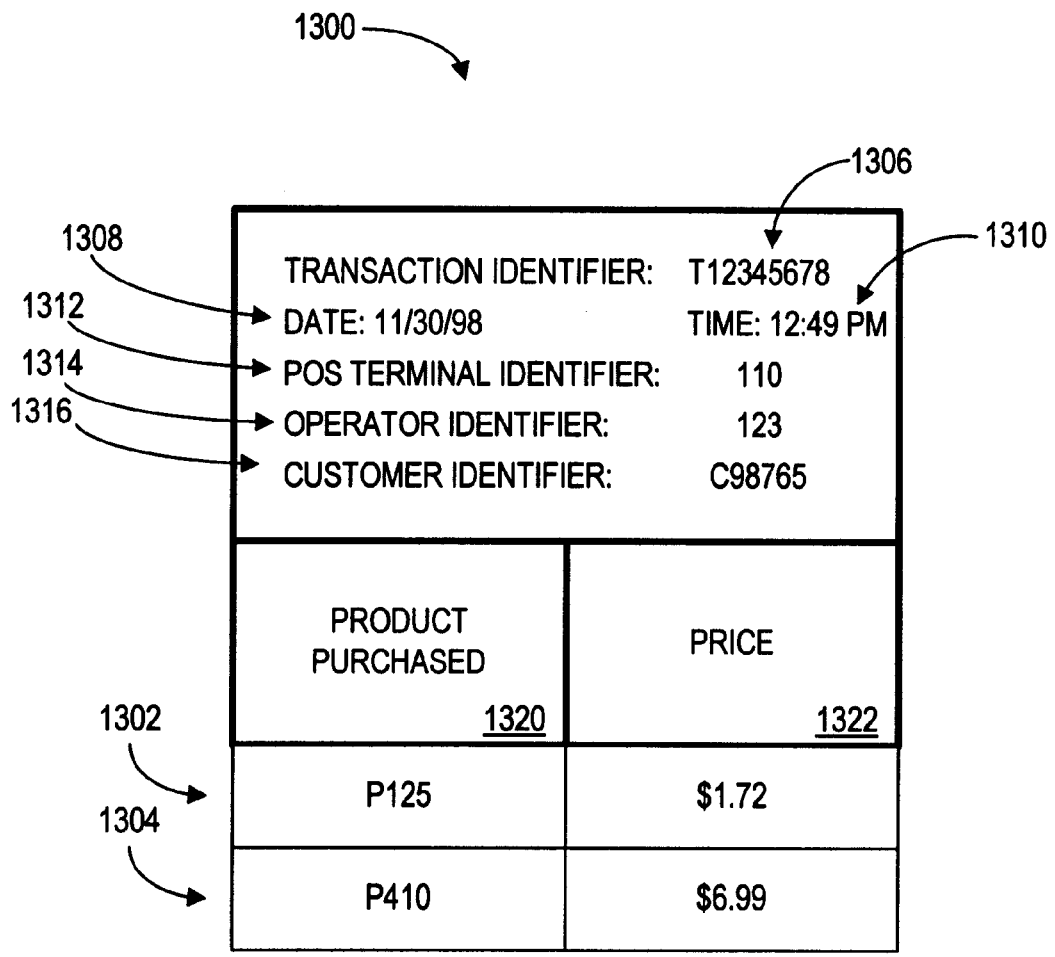
FIG. 13 is a schematic illustration of an exemplary record of a transaction database of the POS controller of FIG. 5.

Referring to FIG. 13, a table 1300 represents a record of an embodiment of the transaction database 536 (FIG. 5). The transaction database 536 typically includes a plurality of such records, each defining a transaction. The table 1300 includes entries 1302 and 1304, each defining a product that is included in the transaction and thus was purchased by a customer. The table 1300 defines a transaction identifier 1306 that uniquely identifies the transaction, a date 1308 and a time 1310 when the transaction occurred, a POS terminal identifier 1312 that identifies the POS terminal involved in the transaction, an operator identifier 1314 that uniquely identifies the operator of the POS terminal, such as a cashier, and a customer identifier 1316 that uniquesly identifies the customer that participated in the transaction. The table 1300 also defines fields for each of the entries 1302 and 1304, which specify (i) a product purchased 1320, and (ii) a price 1322 paid for the product. The price paid for the product may be the retail price of the product, a subscription price paid for the product, or another amount.

Referring to FIG. 14, a table 1400 represents a record of an embodiment of the customer database 538 (FIG. 5). A table 1450 represents a record defining an aggregate of transactions from the transaction database 536 (FIG.5). The table 1400 illustrates subscriptions held by a customer, and the table 1450 illustrates transactions that the customer participated in. Information represented by the table 1450 could be printed in the form of a report by utilizing a plurality of records such as record 1300 (FIG. 13). The customer database 538 typically includes a plurality of records such as the record illustrated by table 1400, each of which includes information about a customer. The table 1400 includes a customer identifier 1420. The customer identifier may comprise a set of alphanumeric characters that uniquely identify a customer. Such a customer identifier may be assigned to a customer when he first signs up for a subscription to a product or when the customer signs up for a frequent shopper program offered by the business. The customer identifier may also comprise a financial account number, such as a credit card number, debit card number, or bank checking account number. Alternatively, the customer identifier may comprise a biometric identifier. Examples of utilizing biometric identifiers include generating a retinal scan, facial scan, or fingerprint scan from the customer, and storing such a scan in memory in association with the customer's name. Table 1400 further includes (i) a name 1422 of the customer, and (ii) an address 1424 of the customer.

The table 1400 also includes entries 1402, 1404, and 1406 each of which describes a subscription to which the customer has subscribed. It will be understood by those skilled in the art that the table 1400 may include any number of entries. The table 1400 also defines fields for each of the entries 1402, 1404 and 1406, which specify (i) a subscription identifier 1426 that uniquely identifies the subscription, (ii) a subscription start time 1428 that identifies the time that the subscription was initiated, (iii) a subscription end time 1430 that identifies the time that the subscription runs out (i.e. the end of the duration of the subscription), (iv) a time of last update 1432 that indicates the time at which the fulfillment of the subscription conditions was last determined, and (v) a status 1434 of the subscription. A status 1434 may indicate one of "active", "fulfilled, or "failed." Once a subscription is initiated, the status of the subscription remains "active" until the product subscription system 10 (FIG. 1) determines that the subscription was either (i) successfully fulfilled, or (ii) the customer failed to fulfill the subscription by not meeting one of the conditions of the subscription.

Table 1450 illustrates a plurality of transactions participated in by a customer. Table 1450 contains a plurality of entries 1452, 1454, and 1456, each of which describes a transaction participated in by the customer. The table 1450 also defines fields for each of the entries 1452, 1454, and 1456, which specify (i) a transaction identifier 1472 that uniquely identifies the transaction, (ii) a product identifier 1474 that identifies the products included in the transaction, and (iii) a transaction time 1476 that identifies the time the transaction occurred. The customer identifier 1470 of table 1450 corresponds to the customer identifier 1420 of table 1400. That is, the transactions described in table 1450 pertain to the customer whose subscriptions are described in table 1400.

Figure 15A:
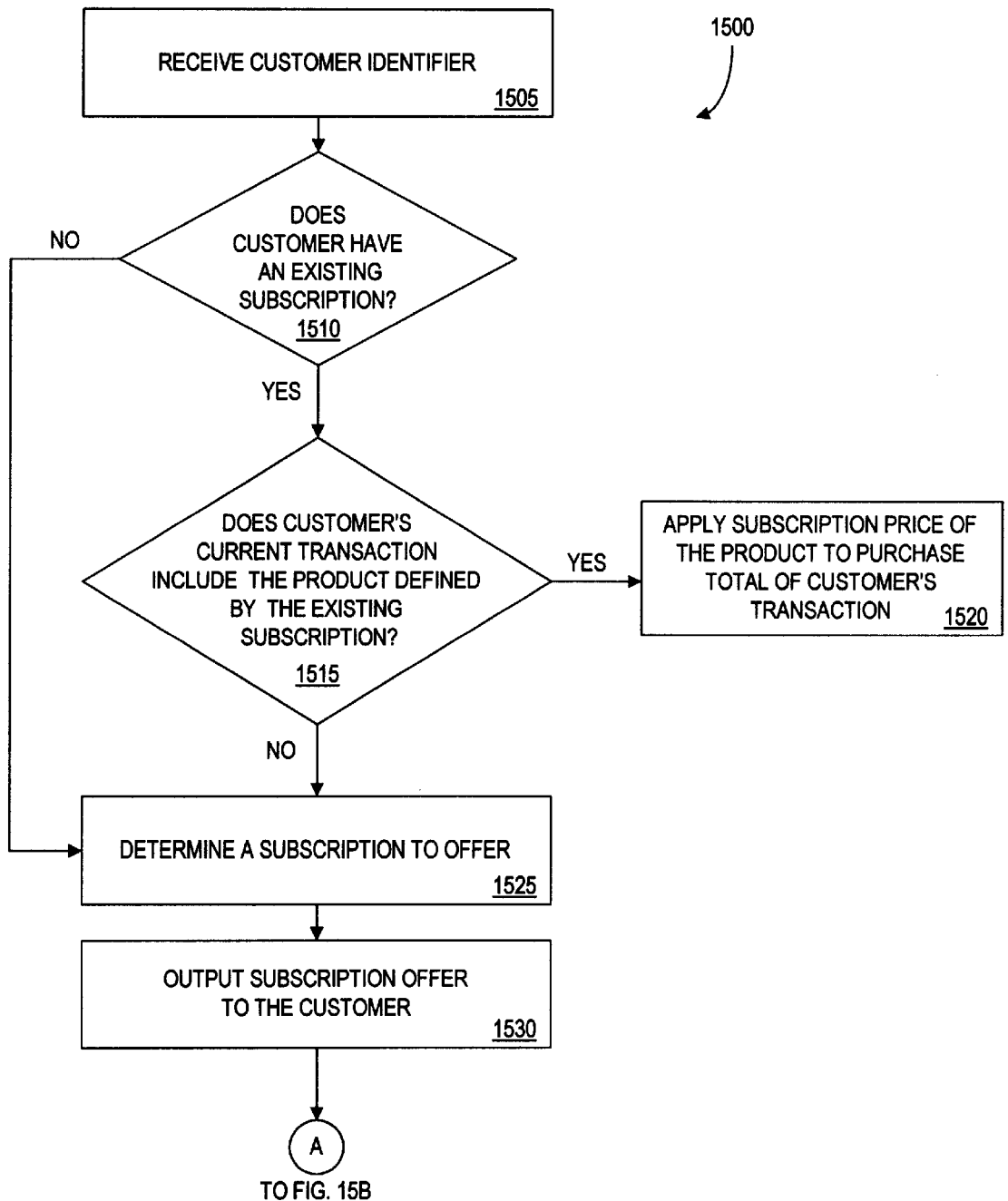
FIG. 15A and FIG. 15B is a process flowchart illustrating the determination and application of a product subscription by the product subscription system of FIG. 1.
Figure 15B:
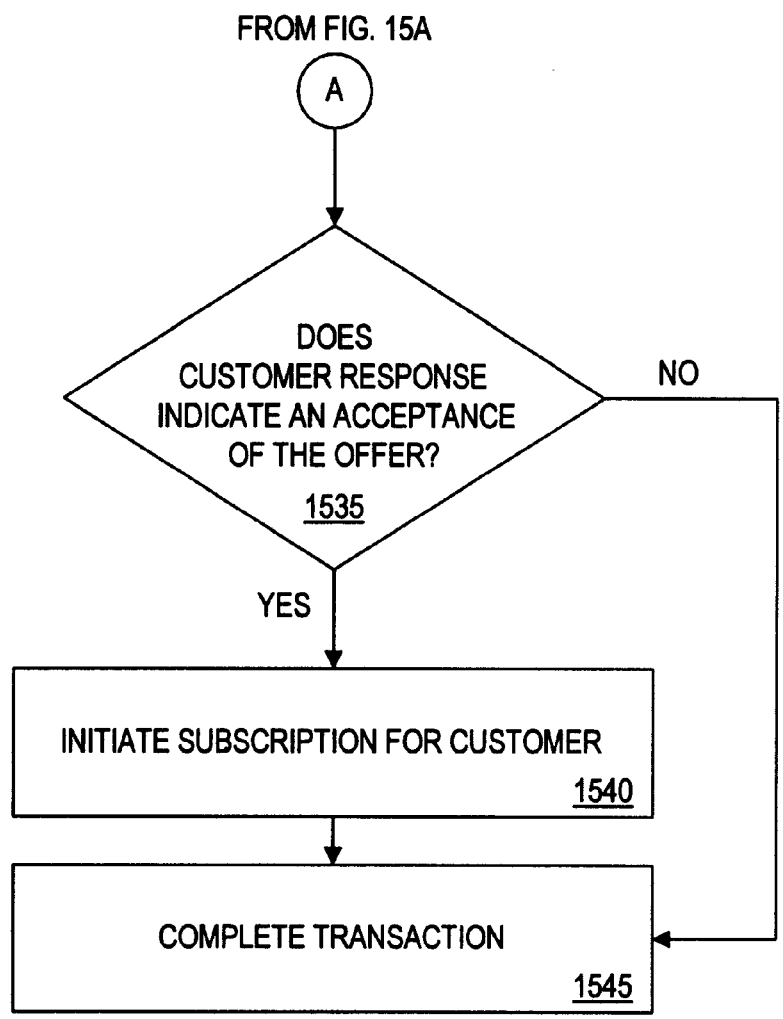

Referring to FIGS. 15A and 15B, a process 1500 illustrates an embodiment of a method for offering and applying subscriptions to a product at a point of sale. In particular, in the illustrated embodiment, a POS terminal communicates with a POS controller to determine whether a customer is currently subscribed to a subscription and to determine an offer for a subscription to output to the customer. Process 1500 is initiated when a POS terminal receives a customer identifier (step 1505). As described above, a customer identifier may comprise an alphanumeric code. If a customer does not have a customer identifier assigned to him, the step 1505 may comprise generating a customer identifier for the customer. Alternately, a customer identifier may be generated at the time a customer accepts a subscription. The POS terminal then communicates with the POS controller 100 (FIG. 1) to determine whether the customer currently has an existing subscription (step 1510). The step 1510 may consist of (i) retrieving the customer's record from a customer database, such as is illustrated by table 1400 (FIG. 14), based on the customer identifier, and (ii) determining whether the record contains any subscription identifier with a corresponding status of "active." If, at step 1510 it is determined that the customer does have an existing subscription, it is determined whether the customer's current transaction includes the product of the customer's current transaction (step 1515). Although process 1500 illustrates the retrieval and application of one existing subscription, one skilled in the art would understand that multiple existing subscriptions may be retrieved and applied in a similar manner.

The step 1515 may comprise matching the product identifiers included in the customer's current transaction to the product identifier of the existing subscription. If it is determined that the customer's current transaction does contain the product of an existing subscription, the subscription price of the product is applied to a purchase total of the customer for the current transaction (step 1520). If process 1500 is performed at the end of a transaction, the step 1520 of applying the subscription price for the product may comprise decreasing the purchase total by the difference between the retail price and the subscription price of the product of the existing subscription. The subscription price may be determined by retrieving it from the inventory database 522 (FIG. 5) based on the product identifier. As illustrated by table 600 (FIG. 6), the inventory database 522 may store the retail price 624 as well as the subscription price 628 of each product offered for sale by the business. Thus, the retail prices and subscription prices stored in the inventory database 522 may be utilized for calculating purchase totals, as will be understood by one skilled in the art. Once the subscription price is applied in step 1520, the process 1500 proceeds to step 1525.

It should be noted that a subscription may entitle a customer to a predefined number of purchases of the product at the subscription price during the duration of the subscription. For example, if the subscription defines a frequency of seven days, the customer may only be entitled to the subscription price for the product once during every seven days. The step 1520 of applying the subscription price may be preceded by a determination of whether the customer has already utilized the subscription price for the product during a time period specified by the subscription frequency (e.g., seven days) and only applying the subscription price if it has not been utilized within the time period. In an alternate embodiment, there may be no limit on the number of times a customer may utilize his entitlement to the subscription price during the duration of the subscription. In such an embodiment, the subscription frequency condition in effect defines a minimum number of purchases per predefined time period.

Referring again to step 1515, if it was determined that the customer's current transaction does not include the product of the existing subscription, the process continues to step 1525. Step 1525 comprises determining a product subscription to offer to the customer. In one embodiment of the present invention, the business defines a maximum number of "active" subscriptions the customer may have at any one time. In such an embodiment, the step 1525 of determining a subscription to offer would only be performed if the customer's number of existing subscriptions did not exceed the maximum number.

The step 1525 may comprise identifying historical purchasing habits of a customer (e.g. by evaluating transactions of the customer in the transaction database) and providing the customer with a subscription that approximates the customer's actual purchasing habits. For example, it may be determined at step 1525 that a customer purchases one case of baby formula every seven to ten days. The determined offer may thus be a subscription to baby formula, wherein the subscription requires the customer to purchase a case of baby formula every seven days. Such a subscription offer would be based on a measured frequency of the customer's purchases of a product. A measured frequency is a determination of the average time, or a range of the number of times, between the purchases of a product by the customer. The determination of the frequency condition to include in the subscription offer may include the utilization of a subscription frequency database 526, such as that illustrated in table 800 (FIG. 8). For example, the measured frequency 822 may be looked up in the table 800 and a corresponding subscription frequency 824 is selected. This selected subscription frequency may then be utilized to select a subscription from the available subscriptions database 534.

Alternatively, the determined offer may be for a subscription to a product other than the previously purchased product (e.g., the baby formula). The other product may be, for example, diapers. This determination to offer the customer diapers may also be based on the customer's historical purchasing habits. However, rather than offering a subscription to a product that the customer has previously purchased, the offered subscription is to a product that is determined to be a likely purchase of that customer. The subscription offer may in this case be based on an anticipated frequency with which the customer is likely to purchase the product. For example, the anticipated frequency may be determined by determining the average frequency with which other customers purchase diapers. The anticipated frequency may also be determined by utilizing the measured frequency of the product that the customer has historically purchased, which in the above example was the baby formula.

A customer may also be offered a subscription to a product based on an item he is currently purchasing rather than on his historical purchases. In this embodiment, the customer may be offered a subscription to a product that is included in his current purchases or may be offered a subscription to a product that is complementary to a product included in the customer's current purchase. Complementary products may be, for example, (i) products that are associated with each other in a database of the business; (ii) products that typically are associated with one another in the average person's mind (e.g. bagels and cream cheese); or (iii) products that are related in terms of their utility (e.g. razors and shaving cream). An appropriate complementary product may be selected by utilizing the complementary products database 530 (FIG. 5), for example the embodiment shown as the table 1000 (FIG. 10).

The product subscription system 10 enables the business to offer subscriptions to customers in order to induce the customer to make frequent purchases at the business. As described above, one manner of accomplishing this is to offer the customer a subscription to a product that approximates the customer's purchasing habits. Typically, a customer would not find such an offer burdensome. The present system and methods also enable the business to offer multiple subscriptions to a customer without unnecessarily eroding its profit margin. The business may offer the customer multiple subscriptions that are active simultaneously but whose conditions are such that the business is not unnecessarily offering discounts without gaining a comparable benefit. A subscription is considered active for the duration of the subscription. In some embodiments the status of the subscription may be set to "failed" if the customer fails to satisfy the conditions of the subscription. That is, the subscription may be deactivated before the duration of the subscription is over.

Thus, the present invention allows a business to maximize the benefits it derives from offering subscriptions without unnecessarily eroding its profits. For example, if a customer has a subscription of a short frequency and a short duration, the customer may be offered an additional subscription of a long frequency and a long duration. For example, a subscription that requires the customer to purchase one gallon of milk once per week defines a subscription frequency of seven days. Thus, if a customer currently has a subscription whose conditions define a subscription frequency of seven days and a subscription duration of three months, the customer may be offered an additional subscription to another product whose conditions define a subscription frequency of thirty days and a subscription duration of one year. The result is that the business is assured of the customer's patronage in the short term, on a frequent basis, as well as for the long term, on a less frequent basis.

Returning now to step 1525, once a product subscription is determined, the subscription offer is output to the customer (step 1530). Step 1530 may comprise displaying the offer directly to the customer on a display device and/or prompting the operator of the POS terminal to verbally present the offer to the customer. It should be noted that the more than one subscription offer may be presented to the customer at step 1530. For example, multiple subscription offers may have been determined at step 1525 and, at step 1530, all of the determined offers or a subset of the determined offers may be presented to the customer.

If it is determined that the customer has indicated an acceptance of the offer (step 1535), the subscription is initiated (step 1540). Initiating a subscription may comprise storing (i) the subscription identifier of the offered subscription, (ii) the start time of the subscription, and/or (iii) the end time of the subscription, which may be based on the duration of the subscription (i.e. if the subscription duration is six months and the start time of the subscription is Jan. 1, 1999, the end time of the subscription is Jul. 1, 1999). The start time of the subscription may comprise (i) the time of acceptance of the subscription offer, (ii) the time of the first usage of the subscription price by the customer, or (iii) another time determined by the business. If the customer is currently purchasing a product to which he accepts a subscription, the subscription price may be applied to the current transaction or to the next purchase of the product by the customer. The step 1545 of initiating a subscription may further comprise charging any deposit associated with the subscription to the purchase total of the customer's current transaction.

The process 1500 proceeds to the step of completing the transaction (step 1545) once (i) the subscription is initiated in step 1540, or (ii) it is determined that the customer response does not indicate an acceptance of the subscription offer in step 1535. Completing the transaction may include conventional steps such as adding the appropriate sales tax to the purchase total of the transaction and receiving payment from the customer for the transaction.

In the above described embodiment of product subscription system 200 (FIG. 2), the customer may request or receive offers for a subscription to a product through a remote customer terminal. Accordingly, the determination of a subscription offer need not be made at a point of sale. Such an embodiment would comprise (i) receiving a customer identifier, (ii) determining a product subscription to offer (step 1525 of process 1500), (iii) outputting the subscription offer to the customer (step 1530 of process 1500), and (iv) initiating a subscription for the customer if the customer indicates an acceptance of the offer (step 1540 of process 1500).

Figure 16:
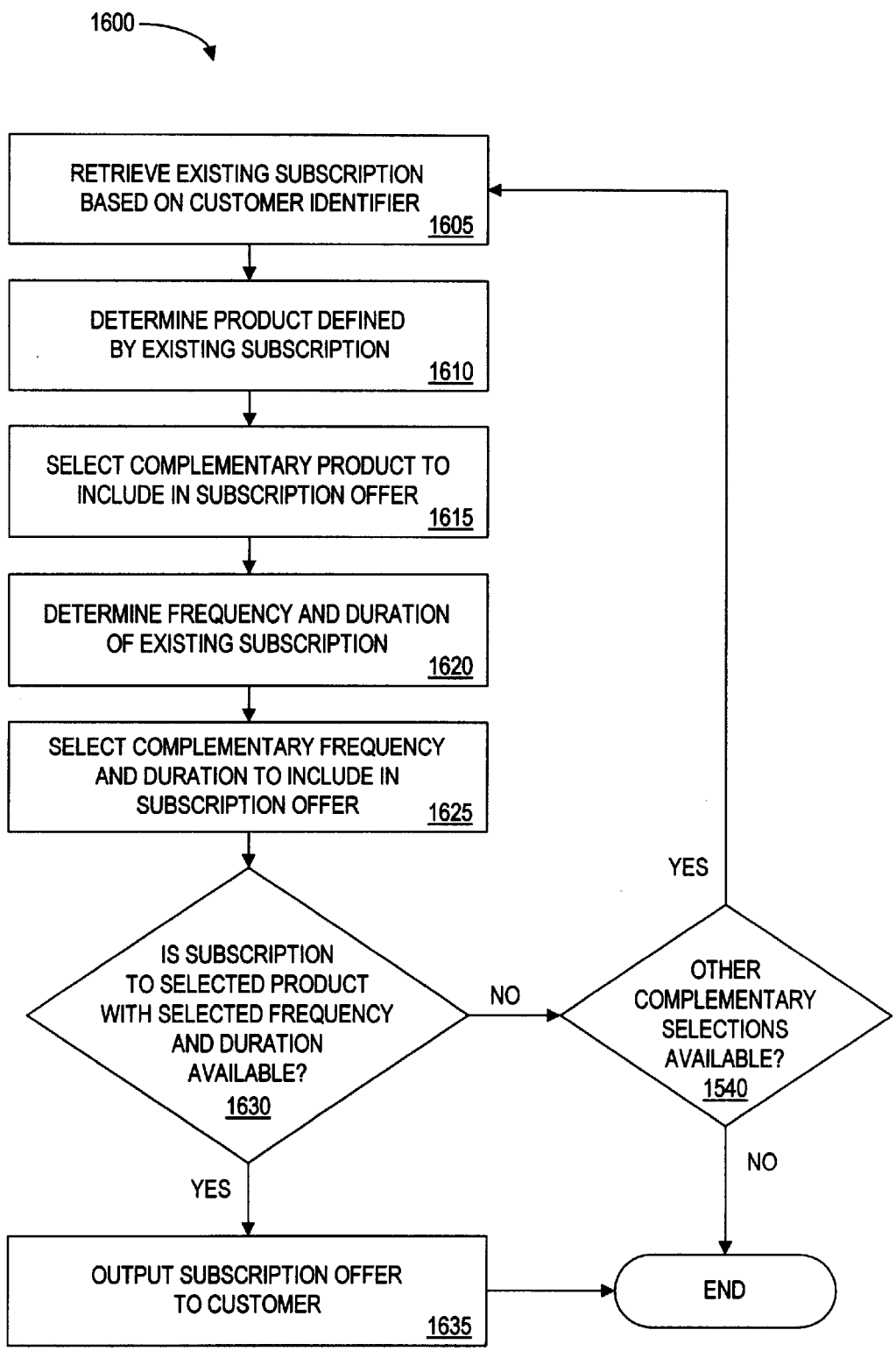
FIG. 16 is a process flow chart illustrating the determination of a subscription to a product based on an existing subscription to a product of a customer, by the product subscription system of FIG. 1.

Referring to FIG. 16, a process 1600 illustrates an embodiment of a method for determining an offer for a subscription to a product based on an existing subscription to a product. In particular, in the illustrated embodiment, a POS terminal communicates with a POS controller to determine the product, frequency, and duration of an existing subscription of a customer and selects a subscription to offer to the customer based on those conditions of the existing subscription. Process 1600 may be performed by either the product subscription system 10 (FIG. 1) or the product subscription system 200 (FIG. 2).

Process 1600 is initiated by retrieving an existing subscription of a customer based on a customer identifier that uniquely identifies the customer (step 1605). Step 1605 may comprise retrieving the customer's record from the customer database 538 (FIG. 5) and ascertaining a subscription in the customer's record that has a corresponding status of "active". An embodiment of a customer database is illustrated in table 1400 and will be referred to for purposes of illustrating process 1600. Once an existing subscription is retrieved in step 1605, the product defined by the existing subscription is determined in step 1610. Referring to table 1400 (FIG. 4) the subscription identifier 1426 includes the product identifier of the subscription. Thus, the product associated with the subscription may be determined from the subscription identifier of the existing subscription. For example, entry 1402 of table 1400 indicates that subscription "A3M-P100" is for the product "P100."

A complementary product is selected based on the product of the existing subscription (step 1615). As described above, selecting a complementary product may comprise determining a product that corresponds to the product of the existing subscription in a complementary products database 530 (FIG. 5). Table 1000 is an embodiment of the complementary products database 530 and will be utilized for illustrative purposes of process 1600. Entry 1002 of table 1000 indicates that products "P180", "P400", and "P510" are complementary products of product "P100", which was retrieved in step 1610. The step 1615 of selecting a complementary product when there are multiple complementary products defined may comprise (i) selecting the first complementary product listed, (ii) selecting all of the complementary products and determining multiple subscription offers for the customer, or (iii) another method of selecting that is determined by the business. For purposes of this example, product "P180" will be selected.

The frequency and duration of the existing subscription are determined (step 1620). For example, the entry 1402 of table 1400 (FIG. 4) indicates that subscription "A3M-P100" defines a subscription frequency of "A" and a subscription duration of "3M". Table 800 may be utilized to determine that "A" indicates a subscription frequency of seven days, as indicated by entry 802. Table 900 may be utilized to determine that "3M" indicates a subscription duration of three months, as indicated by entry 904. Once the subscription frequency and subscription duration of the customer's existing subscription is determined in step 1620, a complementary subscription frequency and subscription duration is selected in step 1625. Such a determination may comprise retrieving the entry corresponding to the subscription frequency and subscription duration combination in the complementary subscription conditions database 532 (FIG. 5). Table 1100 illustrates an embodiment of the complementary subscription conditions database 532 and will be utilized for purposes of this example. As indicated by entry 1102 of table 1100, the subscription frequency—duration combination of "A3M" has a corresponding complementary subscription condition of "C1Y." Table 800 and table 900 may be utilized to determine that "C" indicates a subscription frequency of thirty days and "1Y" indicates a subscription duration of one year. In accordance with one of the objectives of the present invention, a customer that is currently subscribed to a subscription which defines a short subscription frequency (i.e. seven days) and a short subscription duration (e.g. three months) is offered another subscription with a relatively longer frequency (e.g. thirty days) and a relatively longer subscription duration (e.g. one year).

Once the complementary subscription frequency and subscription duration are selected in step 1625, it is determined whether there is an available subscription that defines the selected product, subscription frequency, and subscription duration (step 1630). Step 1630 may comprise querying an available subscriptions database 534 (FIG. 5). Table 1200 illustrates an embodiment of the available subscriptions database 534 and will be used for illustrative purposes of this example. Entry 1210 indicates that a subscription defining the product "P180", subscription frequency "C" and subscription duration "1Y" is available. If is it determined that a subscription with the selected subscription conditions is available, an offer for the subscription is output to the customer (step 1635).

If it is determined in step 1630 that a subscription with the selected conditions is not available, it is determined whether there are other possible selections available with which to define another offer (step 1640). That is, it may be determined if (i) the customer has another existing subscription based on which another subscription offer may be determined, (ii) if there are complementary products corresponding to the product of the existing subscription that may be utilized to determine an offer, and/or (iii) if there are complementary subscription frequency and subscription duration combinations which may be utilized to determine an offer. If all possible selections have been exhausted, the process 1600 ends. Alternately, if all possible selections have been exhausted, a message such as "No subscriptions available at this time" may be output to the customer and/or cashier. If, in step 1640, it is determined that there are other possible selections available, process 1600 repeats, utilizing those other selections. Other methods of determining a subscription to offer to a customer based on an existing subscription of a customer will be understood by those skilled in the art. For example, rather than determining a complementary subscription based on the product defined by an existing subscription, a subscription may be determined based on a category of a product defined by an existing subscription.

Figure 17A:
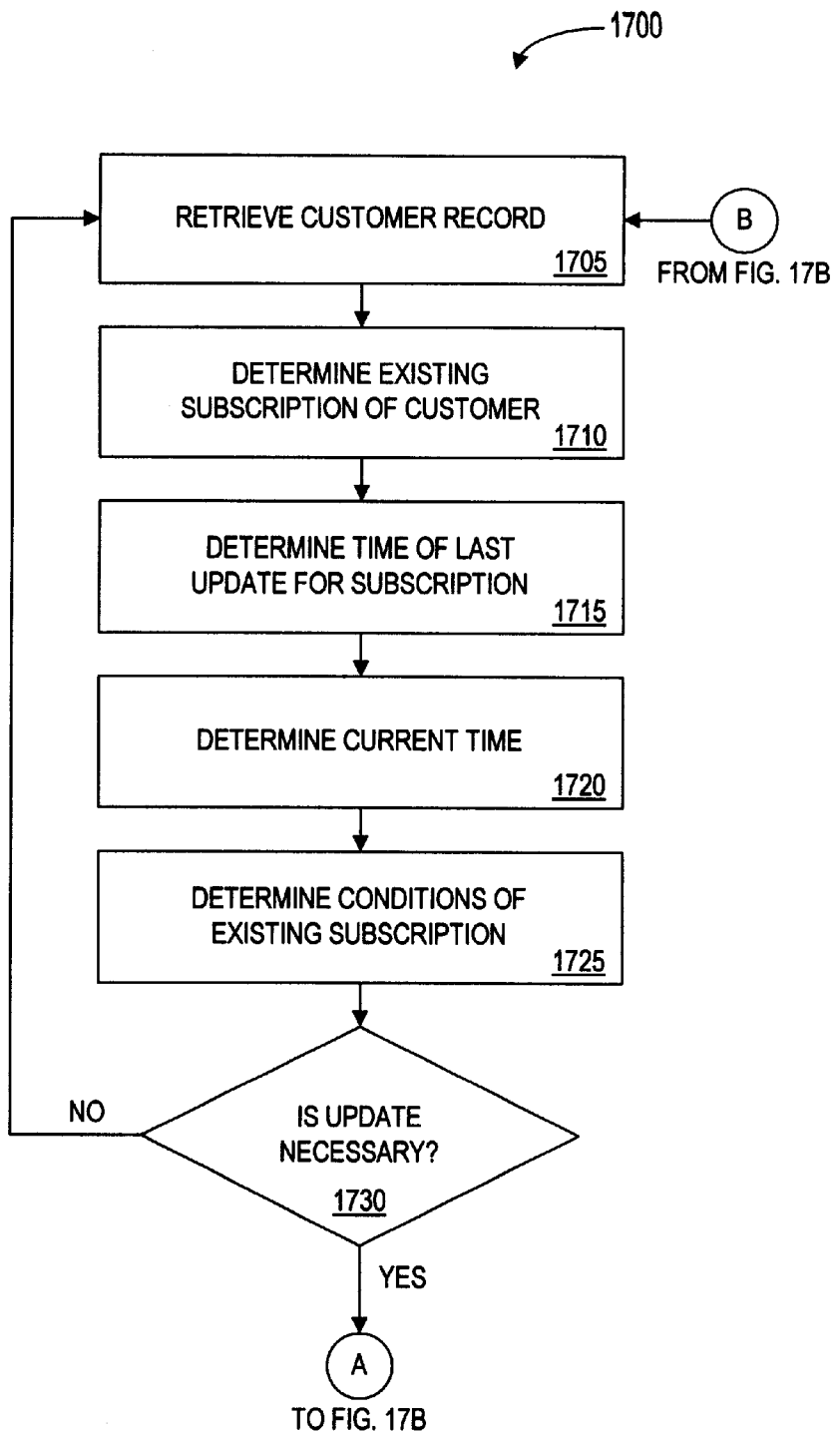
FIG. 17A and FIG. 17B is a process flow chart illustrating the tracking of the completion of a subscription to a product, by the product subscription system of FIG. 1.
Figure 17B:
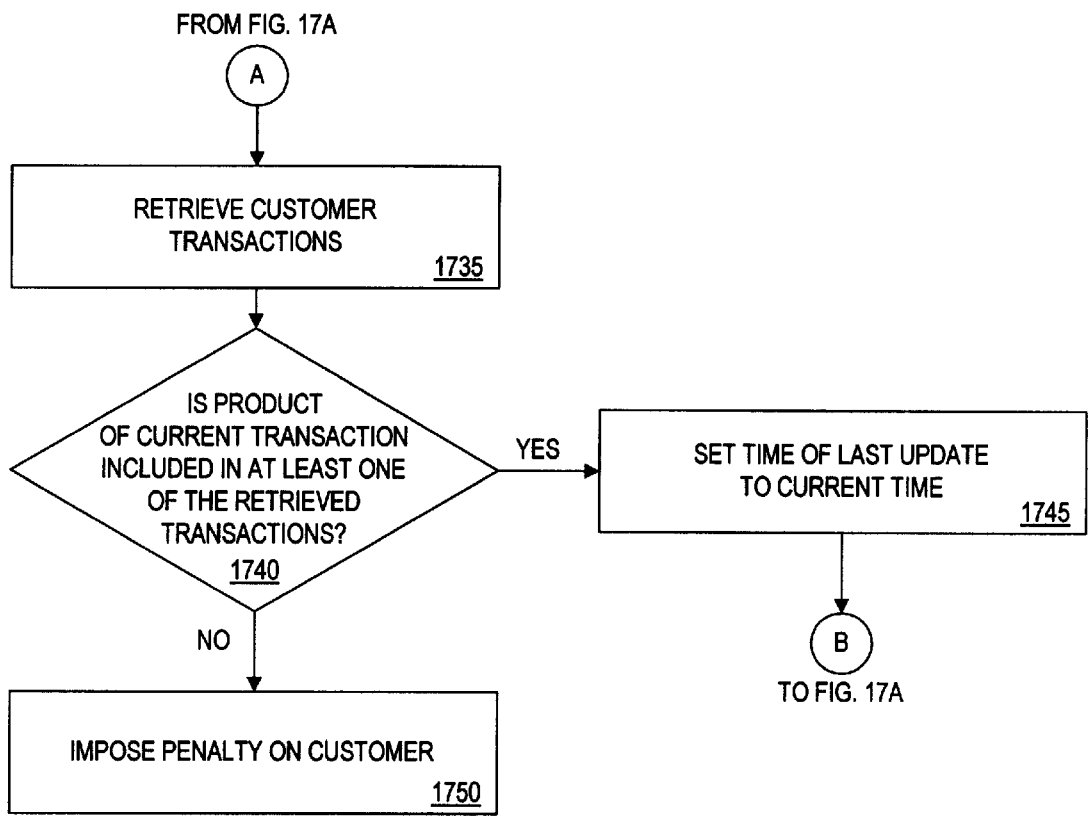

Referring to FIG. 17A and FIG. 17B, a process 1700 illustrates an embodiment of a method for tracking a customer's fulfillment of subscription conditions. In particular, in the illustrated embodiment, a POS controller evaluates a transaction information of a customer and the subscription conditions of a customer's existing subscription to determine whether a customer is successfully meeting the requirements of his subscription. Process 1700 may be performed on a periodically (e.g. every night at midnight). Table 1400 and table 1450 will be utilized to illustrate the steps of process 1700.

Process 1700 is initiated by the retrieval of a customer's record from the customer database 538 (FIG. 5), in step 1705. An existing subscription of the customer is determined in step 1710. An existing subscription may be any subscription in the customer's record with a corresponding status of "active". Entry 1402 of table 1400, for example, illustrates that customer "C12345" has an existing subscription "A3M-P100". The time of the last update is determined in step 1715. Entry 1402 of table 1400 (FIG. 4) illustrates that the time of the last update for subscription "A3M-P100" was Jan. 11, 1999. The current time is determined in step 1720. For the sake of example, it is assumed that the current time is Jan. 18, 1999. Based on the conditions of the existing subscription determined in step 1725, it is determined whether an update is necessary (step 1730). Whether an update is necessary may be based on, for example, the subscription frequency and the time of the last update. For example, as described above, subscription "A3M-P100" defines a frequency of seven days. That is, a customer is required to make a purchase of product "P100" once every seven days. Thus, an update is necessary once every seven days to determine whether the customer has fulfilled the frequency requirement by making a purchase of product "P100" in the past seven days. Entry 1402 of table 1400 indicates that seven days has passed since the time of the last update (i.e. time of last update is Jan. 11, 1999 and current time is Jan. 18, 1999). Therefore an update is necessary. If, in step 1730, it is determined that an update is not necessary, another customer record is retrieved and the step 1705 is performed again.

If it is determined that an update is necessary, the transaction database 536 (FIG. 5) is accessed and queried for any transactions participated in by the customer on any day between the time of the last update and the current time (step 1735). As described above, table 1450 illustrates the results of such a query. It is then determined whether the product defined by the existing subscription is included in at least one of the retrieved transactions (step 1740). Entry 1454 illustrates that the product "P100" was included in the transaction "T63819802". Transaction "T63819802" occurred on Jan. 17, 1999, which is between the time of the last update and the current time. Thus, the subscription frequency requirement of the customer's transaction is satisfied and the status of the subscription remains as "active". The time of the last update for the subscription in the customer's record is set to the current time (step 1745). Another customer's record is then retried and the process reinitiated. If the current customer's record indicates another subscription with a corresponding status of "active", the step 1705 would be repeated for that subscription in a similar manner.

If, in step 1740, it is determined that the product of the existing subscription was not included in at least one of the retrieved transactions, a penalty is imposed on the customer (step 1750). Such a penalty may include (i) retaining of at least a portion of a deposit the customer paid at the time the subscription was accepted or initiated, (ii) charging a predefined monetary amount to a financial account associated with the customer (e.g. a credit card account), (iii) setting the status of the subscription to "fail", (iv) any combination of the aforementioned penalties, and/or (iv) another penalty as defined by the store. The appropriate penalty to impose on the customer may be determined by looking up the subscription penalty in the available subscriptions database 534 (FIG. 5). Table 1200, an illustration of an embodiment of the available subscriptions database, indicates an appropriate penalty associated with each available subscription. Entry 1402 of table 1200, for example, indicates that a failure to satisfy the conditions of subscription "A3M-P100" has a corresponding penalty of a retention of the $2.00 deposit previously paid by the customer.

Alternatively, a customer's subscription status may be updated at the time of a transaction participated in by a customer. That is, when product subscription system 10 (FIG. 1) receives a customer identifier at a point-of-sale, it may update the status of the customer's subscription before it applies the subscription price to the customer's purchase total. Such an update may comprise determining whether the time between the customer's last purchase of the product defined by the subscription and the customer's current purchase of the product defined by the subscription is not greater than the frequency requirement of the subscription. If the time between the customer's purchases is greater than the frequency requirement, the status of the subscription may be changed to "failed" and the subscription price may not be applied to the customer's purchase total.

In other embodiments, the customer may not be penalized for missing a frequency requirement by having the subscription terminated. The customer may merely be penalized by being charged a monetary amount as a penalty. In yet another embodiment, the customer may be allowed a predetermined number of "strikes" before he is penalized. That is, the customer may not be penalized unless the number of times he fails to meet a subscription requirement exceeds a predetermined number. Other forms of penalizing a customer for not meeting the subscription requirements of a subscription will be understood by those skilled in the art.

Figure 18:
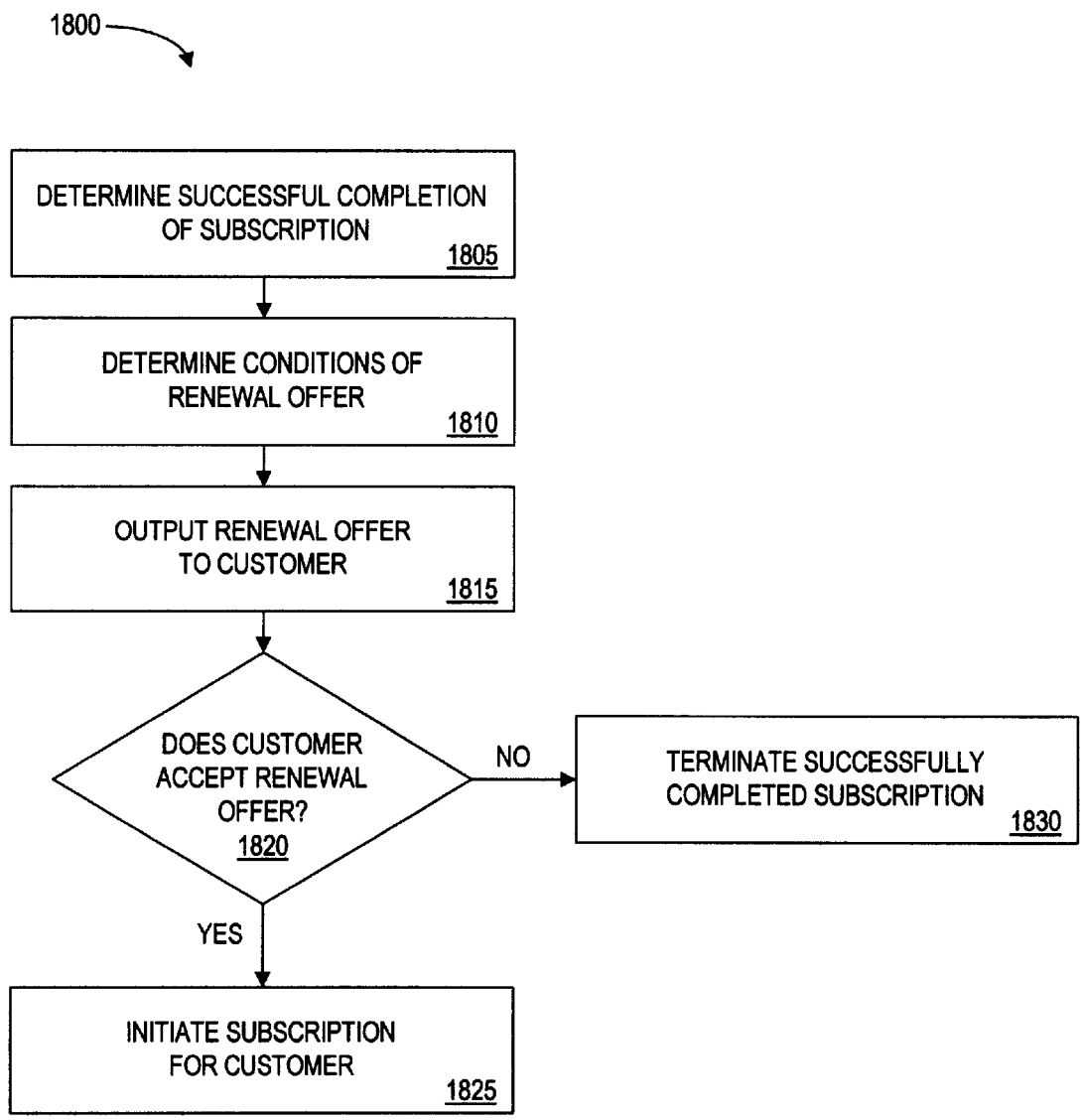
FIG. 18 is a process flow chart illustrating the determination of an offer to renew a subscription, by the product subscription system of FIG. 1.

Referring to FIG. 18, a process 1800 illustrates an embodiment of a method for offering a renewal of a subscription to a customer once a subscription has been successfully completed by a customer. In particular, in the illustrated embodiment, a POS terminal communicates with a POS controller to determine the successful completion of a subscription by a customer and to output an offer for renewal to the customer. In the embodiment illustrated by product subscription system 200 (FIG. 2), the customer terminal 240 may communicate with the POS terminal 205 to determine the successful completion of a subscription by a customer and to output an offer for renewal of the subscription to the customer.

Process 1800 is initiated when it is determined that a customer has successfully completed a subscription (step 1805). The conditions of a renewal offer for the subscription are determined in step 1810. The renewal offer determined in step 1810 may define (i) the same conditions as the completed subscription; or (ii) different conditions than the completed subscription. The different conditions may consist of, for example, a lower subscription price for the product of the subscription than the subscription price of the completed offer. In one embodiment, the subscription price defined by a subscription decreases by a predefined amount or percentage each time a customer renews the subscription. For example, if the subscription is for a gallon of milk and the subscription price of the originally offered subscription is $1.75 per gallon, the first time the customer renews the subscription the subscription price will be $1.70 per gallon, and the subscription price will be decreased by $0.05 every time the customer successfully completes the subscription and accepts a renewal offer. A business may define a minimum subscription price for each product associated with a subscription (e.g. no less than $1.65 per gallon). Thus, once the customer has achieved that minimum subscription price by renewing his subscription a number of times, the customer cannot receive a price lower than that minimum subscription price even if he does renew the subscription another time. Such decreases in the subscription price of a subscription product may be stored in a database and looked up by the product subscription system 10 (FIG. 1) at the time of determining a renewal offer. Such decreases may also be determined based on instructions stored in a program, such as program 520 (FIG. 5). Other methods of determining such conditions for renewal offers will be understood by those skilled in the art.

Once the conditions of the offer are determined in step 1810, the offer for the renewal of the subscription is output to the customer (step 1815). If the customer's response to the renewal offer indicates an acceptance (step 1820), the subscription is initiated for the customer (step 1825). Initiating the renewed subscription may include setting the start time of the subscription in the customer's record of the customer database 538 (FIG. 5) to reflect the current time and setting the end time of the subscription to the appropriate time based on the subscription duration. Alternatively, initiating the subscription may comprise adding a new entry for the subscription to the customer's record in the customer database 538 (FIG. 5).

In the embodiment where the customer had previously paid a deposit upon initiating a subscription, that deposit may be automatically applied to the renewed subscription upon the customer's acceptance of the renewal offer. Additionally, a monetary amount may be paid out to the customer upon the customer' acceptance of the offer. The monetary amount may be in the form of (i) a coupon for the monetary amount, usable for purchases at the business; (ii) a cash payment; (iii) a credit to a financial account associated with the customer; (iv) an increase of the deposit previously paid for by the customer; or (v) any combination thereof. Such a monetary amount may be paid out to the customer upon each renewal of the subscription.

If, in step 1820, the customer's response did not indicate an acceptance of the renewal offer, the customer's successfully completed subscription is terminated (step 1830). Terminating a successfully completed subscription may include setting the status of the subscription in the customer's record of the customer database 538 (FIG. 5) to "fulfilled." Terminating the subscription may also include returning to the customer any deposit he may have paid at the time of initiating or accepting the subscription. Returning the deposit may comprise, for example (i) paying a monetary amount to the customer that is not less than the amount of the deposit, or (ii) applying a discount or credit to a current purchase of the customer, wherein the discount or credited amount is not less than the deposit amount.

In an alternate embodiment of the invention, the customer is issued a coupon upon the initiation of a subscription. The coupon entitles the customer to the product of the subscription at the subscription price. The coupon may define times at which it is valid, as is known in the art. Once the customer redeems the coupon, he is issued another coupon for the subscription product at the subscription price. The coupon issued to the customer upon redemption may be based on the subscription conditions. For example, if the subscription duration is one year and the subscription frequency is thirty days, the customer will be issued a total of twelve coupons, wherein each coupon is valid for thirty days. Alternatively, rather than having a new coupon issued at the time of redemption of a previously issued coupon, the customer may receive all of the coupons he is entitled to for the duration of the subscription at the time of initiating or accepting the subscription. Thus, if the customer accepts an offer for a subscription with a defined duration of one year and a defined frequency of thirty days, he will receive twelve coupons. Each coupon may have different times of validity associated with it (e.g. one coupon is only valid during the month of January and another coupon is only valid during the month of February).

In yet another alternate embodiment of the present invention, the customer pre-pays for the full value of the subscription at the time of accepting or initiating the subscription. For example, if the customer accepts a subscription for a gallon of milk, with a subscription price of $1.00 per gallon, with a subscription duration of one month and a subscription frequency of seven days, the customer may pay $4.00 at the time of accepting or initiating the subscription. The customer thus does not have to pay for the product at the time of redemption (e.g. at the point of sale when purchasing the one gallon of milk once a week that he is entitled to). Rather, the product subscription system 10 (FIG. 1) deducts the subscription price of $1.00 from the stored value of $4.00 associated with the customer (e.g. in the customer's record of the customer database 538). As a penalty, if the customer misses a purchase of the product within the time period defined by the subscription frequency (e.g., the customer fails to purchase a gallon of milk within a seven days period), the $1.00 product subscription price is still deducted from the stored value associated with the customer' subscription.

Although the present invention has been described with respect to a preferred embodiment thereof, those skilled in the art will note that various substitutions may be made to those embodiments described herein without departing from the spirit and scope of the present invention. For example, all of the subscription information may be stored on a magnetically encoded card or smart card, in addition to or instead of being stored at the POS controller.

What is claimed is:

1. A method for establishing a subscription to a product wherein a customer purchases each unit of a product defined by the subscription at a retailer, comprising the steps of:

receiving a customer identifier that identifies a customer;

evaluating data regarding at least one previous purchase of the customer;

determining, based on the data regarding the at least one previous purchase, a frequency with which the customer purchased a first product;

selecting a second product based on the determined frequency;

defining a subscription to the second product by:
setting a minimum number of the second product to be bought within a duration of the subscription;
setting a minimum number of transactions within which the minimum number of the second product is to be bought; and
setting a maximum time within which the minimum number of transactions are to occur; and outputting an offer for a subscription to the second product.

2. The method of claim 1, in which the offer for a subscription defines at least one condition of the subscription.

3. The method of claim 2, in which the at least one condition of the subscription defines a subscription frequency.

4. The method of claim 2, in which the at least one condition of the subscription defines a duration of the subscription.

5. The method of claim 1, in which the step of outputting comprises:
outputting an offer for subscription if the frequency exceeds a predetermined threshold.

6. The method of claim 5, in which the step of outputting comprises:
outputting a first offer if the frequency exceeds a first predetermined threshold; and
outputting a second offer if the frequency exceeds a second predetermined threshold that is greater than the first predetermined threshold.

7. The method of claim 1, in which the first product is equivalent to the second product.

8. The method of claim 1, wherein the determining step comprises:
determining a time interval between a first purchase of the first product and a second purchase of the first product, thereby determining a frequency with which the customer purchased the first product.

9. The method of claim 1, in which the step of determining at least one previous purchase of the customer comprises:
retrieving the data regarding the at least one previous purchase from a database of previous purchases, the data being retrieved based on the customer identifier.

10. The method of claim 1, further comprising:
retrieving, based on the customer identifier, a subscription to which the customer is currently subscribed; and
wherein the step of outputting comprises:
outputting an offer for a subscription to a second product based on the determined frequency and the retrieved subscription.

11. The method of claim 10, further comprising:
looking up in a database a first entry, the first entry corresponding to a product defined by the existing subscription; and
looking up in a database a second entry, the second entry corresponding to a second product that is associated with the first product in the database.

12. The method of claim 1, further comprising:
receiving a response to the offer, the response indicating one of an acceptance and a rejection.

13. The method of claim 12, further comprising:
storing the response in memory.

14. The method of claim 12, further comprising:
initiating a subscription to the product if the response indicates an acceptance.

15. The method of claim 12, wherein the offer defines a subscription deposit.

16. The method of claim 12, further comprising:
charging the subscription deposit to the customer if the response indicates an acceptance.

17. The method of claim 12, further comprising:
returning the subscription deposit to the customer if the subscription is completed successfully.

18. The method of claim 1, wherein the offer includes a penalty to be applied and further comprising:
applying the penalty to the customer if the subscription is not completed successfully.

19. The method of claim 18, wherein applying the penalty comprises retaining a deposit that is paid by the customer at a time of initiating the subscription.

20. The method of claim 18, wherein the penalty is a predetermined amount that is charged to an account associated with the customer.

21. The method of claim 18, wherein the penalty is based on an unfulfilled condition of the subscription.

22. The method of claim 21, wherein the condition is a minimum number of products to be bought within a duration of the subscription.

23. The method of claim 1 wherein the transaction data is received through at least one of a point-of-sale terminal, a Web site, and a telephone.

24. The method of claim 1, wherein the customer identifier is at least one of a frequent shopper identifier, a credit card identifier, a telephone number, a social security number, a coupon identifier, and a license plate identifier.

25. The method of claim 1, wherein the customer identifier is a biometric identifier.

26. The method of claim 25, further comprising generating the biometric identifier by at least one of a retinal scan, a facial scan, and a fingerprint scan.

27. The method of claim 1, in which the step of evaluating data comprises:
retrieving data regarding at least one previous purchase of the customer from a database.

28. The method of claim 1, in which the step of determining a frequency comprises:
determining a frequency with which the customer purchased a first product based on the data regarding the at least one previous purchase and a current purchase.

29. A method for determining a subscription to a product wherein a customer purchases each unit of a product defined by the subscription at a retailer, comprising the steps of:
receiving a customer identifier that identifies a customer;
determining a current purchase of a first product by a customer;
determining a subscription to a second product based on the current purchase by:
setting a minimum number of the second product to be bought within a duration of the subscription;
setting a minimum number of transactions within which the minimum number of the second product is to be bought; and
setting a maximum time within which the minimum number of transactions are to occur; and
outputting an offer for a subscription to a second product.

30. The method of claim 29, further comprising:
looking up in a database a first entry, the first entry corresponding to the first product; and
looking up in a database a second entry, the second entry corresponding to a second product that is associated with the first product in the database.

31. The method of claim 29 in which the first product is equivalent to the second product.

32. The method of claim 31, wherein the offer for the subscription includes a subscription product price to be charged to the customer for a purchase of the second product.

33. The method of claim 32, wherein the subscription product price is applied to a current total price of the customer.

34. The method of claim 29, wherein the second product is complementary to the first product.

35. The method of claim 29, further comprising:
determining, based on the customer identifier, an existing subscription to which the customer is currently subscribed; and
wherein the step of outputting comprises:
outputting an offer for a subscription to a second product based on the data regarding the current purchase of the first product and the existing subscription.

36. The method of claim 29, further comprising:
receiving a response to the offer, the response indicating one of an acceptance and a rejection.

37. The method of claim 36, further comprising:
storing the response in memory.

38. The method of claim 36, further comprising:
initiating a subscription to the product if the response indicates an acceptance.

39. The method of claim 36, wherein the offer includes a subscription fee.

40. The method of claim 39, further comprising:
charging the subscription fee to the customer if the response indicates an acceptance.

41. The method of claim 29, in which the offer for a subscription defines at least one condition of the subscription.

42. The method of claim 41, wherein the at least one term for a subscription includes a price to be charged to the customer for a purchase of the second product.

43. A method for applying a subscription to a product wherein a customer purchases each unit of a product defined by the subscription at a retailer, comprising the steps of:
receiving a customer identifier that identifies a customer;
receiving a product identifier of a product being purchased by the customer;
determining whether the customer has a subscription to the product;
determining a required frequency for purchasing the product defined by the subscription, wherein the required frequency comprises a maximum time period between purchases of the product by the customer;
determining a time of a previous purchase of the product by the customer;
determining a current time;
calculating whether a time period between the time of the previous purchase and the current time is not greater than the maximum time period between purchases;
determining an end time for the subscription;
calculating whether the current time is past the end time; and
adjusting a purchase total based on whether the customer has a subscription to the product, if the time period between the time of the previous purchase and the current time is not greater than the maximum time period between purchases and the current time is not past the end time.

44. The method of claim 43, wherein the step of adjusting comprises:
adding a first price to the purchase total if the customer has a subscription to the product; and
adding a second price to the purchase total if the customer does not have a subscription to the product.

45. The method of claim 43, further comprising:
determining a current time.

46. The method of claim 45, wherein the step of adjusting comprises:
adding a first product price to a purchase total of the customer if the current time is before a predetermined time; and
adding a second product price to a purchase total of the customer if the current time is not before a predetermined time.

47. The method of claim 46, wherein the first product price is a subscription product price.

48. A method for controlling a subscription to a product wherein a customer purchases each unit of a product defined by the subscription at a retailer, comprising the steps of:
receiving a customer identifier that identifies a customer;
determining a successful completion, by the customer, of a first subscription to a first product, wherein the first subscription defines a first minimum number of the first product to be bought and a first minimum number of transactions within which the first minimum number of the first product is to be bought;
outputting an offer for a second subscription to a second product, wherein the second subscription defines a second minimum number of the second product to be bought and a second minimum number of transactions within which the second minimum number of the second product is to be bought and wherein a condition of the second subscription is based on a condition of the first subscription; and
receiving a response to the offer, the response indicating one of an acceptance and a rejection.

49. The method of claim 48, wherein the first subscription has an associated first deposit that was paid by the customer at a time of initiating the first subscription, and
wherein the offer for the second subscription includes a second deposit required to initiate the second subscription.

50. The method of claim 49, wherein the second deposit is greater than the first deposit.

51. The method of claim 50, wherein the first deposit is applied as the second deposit if the response indicates an acceptance.

52. The method of claim 50, further comprising:
outputting a monetary amount to the customer if the response indicates a rejection, wherein the monetary amount is greater than the first deposit.

53. The method of claim 49, further comprising:
outputting a monetary amount to the customer if the response indicates a rejection, wherein the monetary amount is equal to the first deposit.

54. The method of claim 48, wherein the first product is the second product.

55. The method of claim 54, wherein the first product has an associated first price and the second product has an associated second price, and
the first price is greater than the second price.

56. An apparatus for providing a subscription to a product wherein a customer purchases each unit of a product defined by the subscription at a retailer, comprising:
a processor, and
a storage device that stores a program for directing the processor;
the processor being operative with the program to:
receive a customer identifier that identifies a customer;
evaluate data regarding at least one previous purchase of the customer;
determine, based on the data regarding the at least one previous purchase, a frequency with which the customer purchased a first product;

select a second product based on the determined frequency;
define a subscription to the second product by:
setting a minimum number of the second product to be bought within a duration of the subscription;
setting a minimum number of transactions within which the minimum number of the second product is to be bought; and
setting a maximum time within which the minimum number of transactions are to occur; and
output an offer for a subscription to the second product.

57. An apparatus for providing a subscription to a product wherein a customer purchases each unit of a product defined by the subscription at a retailer, comprising:
a processor, and
a storage device that stores a program for directing the processor;
the processor being operative with the program to:
receive a customer identifier that identifies a customer;
determine a current purchase of a first product by a customer;
determine a subscription to a second product based on the current purchase by:
setting a minimum number of the second product to be bought within a duration of the subscription;
setting a minimum number of transactions within which the minimum number of the second product is to be bought; and
setting a maximum time within which the minimum number of transactions are to occur; and
output an offer for a subscription to a second product, the offer being based on the current purchase.

58. An apparatus for providing a subscription to a product wherein a customer purchases each unit of a product defined by the subscription at a retailer, comprising:
a processor, and
a storage device that stores a program for directing the processor;
the processor being operative with the program to:
receive a customer identifier that identifies a customer;
receive a product identifier of a product being purchased by the customer;
determine whether the customer has a subscription to the product;
determine a required frequency for purchasing the product defined by the subscription, wherein the required frequency comprises a maximum time period between purchases of the product by the customer;
determine a time of a previous purchase of the product by the customer; determining a current time;
calculate whether a time period between the time of the previous purchase and the current time is not greater than the maximum time period between purchases;
determine an end time for the subscription;
calculate whether the current time is past the end time; and
adjust a purchase total based on whether the customer has a subscription to the product, if the time period between the time of the previous purchase and the current time is not greater than the maximum time period between purchases and the current time is not past the end time.

59. An apparatus for providing a subscription to a product wherein a customer purchases each unit of a product defined by the subscription at a retailer, comprising:
a processor, and
a storage device that stores a program for directing the processor;
the processor being operative with the program to:
receive a customer identifier that identifies a customer;
determine a successful completion, by the customer, of a first subscription to a first product, wherein the first subscription defines a first minimum number of the first product to be bought and a first minimum number of transactions within which the first minimum number of the first product is to be bought;
output an offer for a second subscription to a second product, wherein the second subscription defines a second minimum number of the second product to be bought and a second minimum number of transactions within which the second minimum number of the second product is to be bought and wherein a condition of the second subscription is based on a condition of the first subscription; and
receive a response to the offer, the response indicating one of an acceptance and a rejection.

60. A computer readable medium encoded with instructions for directing a processor to:
receive a customer identifier that identifies a customer;
evaluate data regarding at least one previous purchase of the customer;
determine, based on the data regarding the at least one previous purchase, a frequency with which the customer purchased a first product;
select a second product based on the determined frequency;
define a subscription to the second product by:
setting a minimum number of the second product to be bought within a duration of the subscription;
setting a minimum number of transactions within which the minimum number of the second product is to be bought; and
setting a maximum time within which the minimum number of transactions are to occur; and
output an offer for a subscription to the second product, wherein the customer purchases each unit of a product defined by the subscription at a retailer.

61. A computer readable medium encoded with instructions for directing a processor to:
receive a customer identifier that identifies a customer;
determine a current purchase of a first product by a customer;
determine a subscription to a second product based on the current purchase by:
setting a minimum number of the second product to be bought within a duration of the subscription;
setting a minimum number of transactions within which the minimum number of the second product is to be bought; and
setting a maximum time within which the minimum number of transactions are to occur; and
output an offer for a subscription to a second product, wherein the customer purchases each unit of a product defined by the first and second subscription at a retailer.

62. A computer readable medium encoded with instructions for directing a processor to:
receive a customer identifier that identifies a customer;
receive a product identifier of a product being purchased by the customer;
determine whether the customer has a subscription to the product, wherein the customer purchases each unit of a product defined by the subscription at a retailer;

determine a required frequency for purchasing the product defined by the subscription, wherein the required frequency comprises a maximum time period between purchases of the product by the customer;

determine a time of a previous purchase of the product by the customer; determining a current time;

calculate whether a time period between the time of the previous purchase and the current time is not greater than the maximum time period between purchases;

determine an end time for the subscription;

calculate whether the current time is past the end time; and adjust a purchase total based on whether the customer has a subscription to the product, if the time period between the time of the previous purchase and the current time is not greater than the maximum time period between purchases and the current time is not past the end time.

63. A computer readable medium encoded with instructions for directing a processor to:

receive a customer identifier that identifies a customer;

determine a successful completion, by the customer, of a first subscription to a first product, wherein the first subscription defines a first minimum number of the first product to be bought and a first minimum number of transactions within which the first minimum number of the first product is to be bought;

output an offer for a second subscription to a second product, wherein the second subscription defines a second minimum number of the second product to be bought and a second minimum number of transactions within which the second minimum number of the second product is to be bought and wherein a condition of the second subscription is based on a condition of the first subscription;

receive a response to the offer, the response indicating one of an acceptance and a rejection; and wherein a customer purchases each unit of a product defined by the first and second subscription at a retailer.

* * * * *